(12) United States Patent
Carter et al.

(10) Patent No.: US 12,345,838 B2
(45) Date of Patent: **\*Jul. 1, 2025**

(54) METHOD AND APPARATUS FOR PRODUCING AN ACOUSTIC FIELD

(71) Applicant: Ultrahaptics IP Ltd, Bristol (GB)

(72) Inventors: Thomas Andrew Carter, Bristol (GB); Benjamin John Oliver Long, Bristol (GB); Sriram Subramanian, Bristol (GB)

(73) Assignee: ULTRAHAPTICS IP LTD, Bristol (GB)

( \* ) Notice: Subject to any disclaimer, the term of this patent is extended or adjusted under 35 U.S.C. 154(b) by 0 days.

This patent is subject to a terminal disclaimer.

(21) Appl. No.: 18/188,584

(22) Filed: Mar. 23, 2023

(65) Prior Publication Data

US 2023/0228857 A1    Jul. 20, 2023

Related U.S. Application Data

(63) Continuation of application No. 18/060,556, filed on Nov. 30, 2022, now Pat. No. 11,624,815, which is a
(Continued)

(30) Foreign Application Priority Data

May 8, 2013    (GB) ..................................... 1308274

(51) Int. Cl.
*G01S 7/52*        (2006.01)
*G01S 7/539*       (2006.01)
(Continued)

(52) U.S. Cl.
CPC ...... *G01S 7/52004* (2013.01); *G01S 7/52003* (2013.01); *G01S 7/539* (2013.01);
(Continued)

(58) Field of Classification Search
None
See application file for complete search history.

(56) References Cited

U.S. PATENT DOCUMENTS 4,218,921 A    8/1980    Berge
4,760,525 A    7/1988    Webb
(Continued)

FOREIGN PATENT DOCUMENTS

CA    2470115 A1    6/2003
CA    2909804 A1    11/2014
(Continued)

OTHER PUBLICATIONS

Notice of Allowance dated Dec. 21, 2018 for U.S. Appl. No. 15/983,864 (pp. 1-7).
(Continued)

*Primary Examiner* — Hovhannes Baghdasaryan
(74) *Attorney, Agent, or Firm* — Koffsky Schwalb LLC; Mark I. Koffsky

(57) ABSTRACT

The present invention concerns a method and apparatus for the modulation of an acoustic field for providing tactile sensations. A method of creating haptic feedback using ultrasound is provided. The method comprises the steps of generating a plurality of ultrasound waves with a common focal point using a phased array of ultrasound transducers, the common focal point being a haptic feedback point, and modulating the generation of the ultrasound waves using a waveform selected to produce little or no audible sound at the haptic feedback point.

33 Claims, 4 Drawing Sheets

Related U.S. Application Data continuation of application No. 16/404,660, filed on May 6, 2019, now Pat. No. 11,543,507, which is a continuation of application No. 15/983,864, filed on May 18, 2018, now Pat. No. 10,281,567, which is a continuation of application No. 14/889,128, filed as application No. PCT/GB2014/051319 on Apr. 29, 2014, now Pat. No. 9,977,120.

(51) Int. Cl.
*G01S 15/36* (2006.01)
*G01S 15/87* (2006.01)
*G06F 3/01* (2006.01)
*G06F 3/04815* (2022.01)
*H04S 7/00* (2006.01)

(52) U.S. Cl.
CPC ............ *G01S 15/36* (2013.01); *G01S 15/876* (2013.01); *G06F 3/015* (2013.01); *G06F 3/016* (2013.01); *G06F 3/04815* (2013.01); *H04S 7/30* (2013.01); *G01S 2007/52007* (2013.01); *G06F 3/017* (2013.01)

(56) References Cited

U.S. PATENT DOCUMENTS

| | | |
|---|---|---|
| 4,771,205 A | 9/1988 | Mequio |
| 4,881,212 A | 11/1989 | Takeuchi |
| 5,122,993 A | 6/1992 | Hikita |
| 5,226,000 A | 7/1993 | Moses |
| 5,235,986 A | 8/1993 | Maslak |
| 5,243,344 A | 9/1993 | Koulopoulos |
| 5,329,682 A | 7/1994 | Thurn |
| 5,371,834 A | 12/1994 | Tawel |
| 5,422,431 A | 6/1995 | Ichiki |
| 5,426,388 A | 6/1995 | Flora |
| 5,477,736 A | 12/1995 | Lorraine |
| 5,511,296 A | 4/1996 | Dias |
| 5,729,694 A | 3/1998 | Holzrichter |
| 5,859,915 A | 1/1999 | Norris |
| 6,029,518 A | 2/2000 | Oeftering |
| 6,193,936 B1 | 2/2001 | Gardner |
| 6,216,538 B1 | 4/2001 | Yasuda |
| 6,436,051 B1 | 8/2002 | Morris |
| 6,503,204 B1 | 1/2003 | Sumanaweera |
| 6,533,455 B2 | 3/2003 | Graumann |
| 6,647,359 B1 | 11/2003 | Verplank |
| 6,771,294 B1 | 8/2004 | Pulli |
| 6,772,490 B2 | 8/2004 | Toda |
| 6,800,987 B2 | 10/2004 | Toda |
| 7,107,159 B2 | 9/2006 | German |
| 7,109,789 B2 | 9/2006 | Spencer |
| 7,154,928 B2 | 12/2006 | Sandstrom |
| 7,182,726 B2 | 2/2007 | Williams |
| 7,225,404 B1 | 5/2007 | Zilles |
| 7,284,027 B2 | 10/2007 | Jennings, III |
| 7,345,600 B1 | 3/2008 | Fedigan |
| 7,487,662 B2 | 2/2009 | Schabron |
| 7,497,662 B2 | 3/2009 | Mollmann |
| 7,577,260 B1 | 8/2009 | Hooley |
| 7,692,661 B2 | 4/2010 | Cook |
| RE42,192 E | 3/2011 | Schabron |
| 7,966,134 B2 | 6/2011 | German |
| 8,000,481 B2 | 8/2011 | Nishikawa |
| 8,123,502 B2 | 2/2012 | Blakey |
| 8,269,168 B1 | 9/2012 | Axelrod |
| 8,279,193 B1 | 10/2012 | Birnbaum |
| 8,351,646 B2 | 1/2013 | Fujimura |
| 8,369,973 B2 | 2/2013 | Risbo |
| 8,594,350 B2 | 11/2013 | Hooley |
| 8,607,922 B1 | 12/2013 | Werner |
| 8,782,109 B2 | 7/2014 | Tsutsui |
| 8,823,674 B2 | 9/2014 | Birnbaum |
| 8,833,510 B2 | 9/2014 | Koh |
| 8,884,927 B1 | 11/2014 | Cheatham, III |
| 9,208,664 B1 | 12/2015 | Peters |
| 9,267,735 B2 | 2/2016 | Funayama |
| 9,421,291 B2 | 8/2016 | Robert |
| 9,612,658 B2 | 4/2017 | Subramanian |
| 9,662,680 B2 | 5/2017 | Yamamoto |
| 9,667,173 B1 | 5/2017 | Kappus |
| 9,786,092 B2 | 10/2017 | Santhanam |
| 9,795,446 B2 | 10/2017 | Dimaio |
| 9,816,757 B1 | 11/2017 | Zielinski |
| 9,841,819 B2 | 12/2017 | Carter |
| 9,863,699 B2 | 1/2018 | Corbin, III |
| 9,898,089 B2 | 2/2018 | Subramanian |
| 9,936,908 B1 | 4/2018 | Acosta |
| 9,945,818 B2 | 4/2018 | Ganti |
| 9,958,943 B2 | 5/2018 | Long |
| 9,977,120 B2 | 5/2018 | Carter |
| 10,101,811 B2 | 10/2018 | Carter |
| 10,101,814 B2 | 10/2018 | Carter |
| 10,133,353 B2 | 11/2018 | Eid |
| 10,140,776 B2 | 11/2018 | Schwarz |
| 10,146,353 B1 | 12/2018 | Smith |
| 10,168,782 B1 | 1/2019 | Tchon |
| 10,268,275 B2 | 4/2019 | Carter |
| 10,281,567 B2 | 5/2019 | Carter |
| 10,318,008 B2 | 6/2019 | Sinha |
| 10,383,694 B1 | 8/2019 | Venkataraman |
| 10,444,842 B2 | 10/2019 | Long |
| 10,469,973 B2 | 11/2019 | Hayashi |
| 10,496,175 B2 | 12/2019 | Long |
| 10,497,358 B2 | 12/2019 | Tester |
| 10,510,357 B2 | 12/2019 | Kovesi |
| 10,520,252 B2 | 12/2019 | Momen |
| 10,523,159 B2 | 12/2019 | Megretski |
| 10,531,212 B2 | 1/2020 | Long |
| 10,535,174 B1 | 1/2020 | Rigiroli |
| 10,569,300 B2 | 2/2020 | Hoshi |
| 10,593,101 B1 | 3/2020 | Han |
| 10,599,434 B1 | 3/2020 | Barrett |
| 10,657,704 B1 | 5/2020 | Han |
| 10,685,538 B2 | 6/2020 | Carter |
| 10,755,538 B2 | 8/2020 | Carter |
| 10,818,162 B2 | 10/2020 | Carter |
| 10,911,861 B2 | 2/2021 | Buckland |
| 10,915,177 B2 | 2/2021 | Carter |
| 10,921,890 B2 | 2/2021 | Subramanian |
| 10,930,123 B2 | 2/2021 | Carter |
| 10,943,578 B2 | 3/2021 | Long |
| 10,991,074 B2 | 4/2021 | Bousmalis |
| 11,048,329 B1 | 6/2021 | Lee |
| 11,080,874 B1 | 8/2021 | Bardagjy |
| 11,098,951 B2 | 8/2021 | Kappus |
| 11,106,273 B2 | 8/2021 | Hazra |
| 11,113,860 B2 | 9/2021 | Rigiroli |
| 11,125,866 B2 | 9/2021 | Sumi |
| 11,169,610 B2 | 11/2021 | Sarafianou |
| 11,189,140 B2 | 11/2021 | Long |
| 11,204,644 B2 | 12/2021 | Long |
| 11,276,281 B2 | 3/2022 | Carter |
| 11,334,165 B1 | 5/2022 | Clements |
| 11,350,909 B2 | 6/2022 | Maresca |
| 11,475,247 B2 | 10/2022 | Nikolenko |
| 11,531,395 B2 | 12/2022 | Kappus |
| 11,543,507 B2 | 1/2023 | Carter |
| 11,550,395 B2 | 1/2023 | Beattie |
| 11,550,432 B2 | 1/2023 | Carter |
| 11,553,295 B2 | 1/2023 | Kappus |
| 11,669,661 B2 | 6/2023 | Mirzendehdel |
| 11,693,113 B2 | 7/2023 | Bachmann |
| 11,704,983 B2 | 7/2023 | Long |
| 11,714,492 B2 | 8/2023 | Carter |
| 11,715,453 B2 | 8/2023 | Kappus |
| 11,727,790 B2 | 8/2023 | Carter |
| 11,740,018 B2 | 8/2023 | Kappus |
| 11,742,870 B2 | 8/2023 | Long |
| 11,768,540 B2 | 9/2023 | Long |
| 11,816,267 B2 | 11/2023 | Kappus |
| 11,830,351 B2 | 11/2023 | Carter |
| 11,830,352 B1 | 11/2023 | Agrawal |

(56) References Cited

U.S. PATENT DOCUMENTS

| | | |
|---|---|---|
| 11,842,517 B2 | 12/2023 | Lyons |
| 11,886,639 B2 | 1/2024 | Brown |
| 11,921,928 B2 | 3/2024 | Iodice |
| 11,955,109 B2 | 4/2024 | Long |
| 12,100,288 B2 | 9/2024 | Carter |
| 12,158,522 B2 | 12/2024 | Iodice |
| 2001/0007591 A1 | 7/2001 | Pompei |
| 2001/0033124 A1 | 10/2001 | Norris |
| 2001/0053204 A1 | 12/2001 | Navab |
| 2002/0149570 A1 | 10/2002 | Knowles |
| 2003/0024317 A1 | 2/2003 | Miller |
| 2003/0144032 A1 | 7/2003 | Brunner |
| 2003/0182647 A1 | 9/2003 | Radeskog |
| 2004/0005715 A1 | 1/2004 | Schabron |
| 2004/0014434 A1 | 1/2004 | Haardt |
| 2004/0052387 A1 | 3/2004 | Norris |
| 2004/0091119 A1 | 5/2004 | Duraiswami |
| 2004/0210158 A1 | 10/2004 | Organ |
| 2004/0226378 A1 | 11/2004 | Oda |
| 2004/0264707 A1 | 12/2004 | Yang |
| 2005/0052714 A1 | 3/2005 | Klug |
| 2005/0056851 A1 | 3/2005 | Althaus |
| 2005/0148874 A1 | 7/2005 | Brock-Fisher |
| 2005/0212760 A1 | 9/2005 | Marvit |
| 2005/0226437 A1 | 10/2005 | Pellegrini |
| 2005/0267695 A1 | 12/2005 | German |
| 2005/0273483 A1 | 12/2005 | Dent |
| 2006/0085049 A1 | 4/2006 | Cory |
| 2006/0090955 A1 | 5/2006 | Cardas |
| 2006/0091301 A1 | 5/2006 | Trisnadi |
| 2006/0164428 A1 | 7/2006 | Cook |
| 2007/0036492 A1 | 2/2007 | Lee |
| 2007/0056374 A1 | 3/2007 | Andrews |
| 2007/0094317 A1 | 4/2007 | Wang |
| 2007/0177681 A1 | 8/2007 | Choi |
| 2007/0214462 A1 | 9/2007 | Boillot |
| 2007/0216711 A1 | 9/2007 | Smith |
| 2007/0236450 A1 | 10/2007 | Colgate |
| 2007/0263741 A1 | 11/2007 | Erving |
| 2008/0012647 A1 | 1/2008 | Risbo |
| 2008/0027686 A1 | 1/2008 | Mollmann |
| 2008/0084789 A1 | 4/2008 | Altman |
| 2008/0130906 A1 | 6/2008 | Goldstein |
| 2008/0152191 A1 | 6/2008 | Fujimura |
| 2008/0226088 A1 | 9/2008 | Aarts |
| 2008/0273723 A1 | 11/2008 | Hartung |
| 2008/0291198 A1 | 11/2008 | Chun |
| 2008/0300055 A1 | 12/2008 | Lutnick |
| 2009/0093724 A1 | 4/2009 | Pernot |
| 2009/0116660 A1 | 5/2009 | Croft, III |
| 2009/0232684 A1 | 9/2009 | Hirata |
| 2009/0251421 A1 | 10/2009 | Bloebaum |
| 2009/0319065 A1 | 12/2009 | Risbo |
| 2010/0013613 A1 | 1/2010 | Weston |
| 2010/0016727 A1 | 1/2010 | Rosenberg |
| 2010/0030076 A1 | 2/2010 | Vortman |
| 2010/0044120 A1 | 2/2010 | Richter |
| 2010/0066512 A1 | 3/2010 | Rank |
| 2010/0085168 A1 | 4/2010 | Kyung |
| 2010/0103246 A1 | 4/2010 | Schwerdtner |
| 2010/0109481 A1 | 5/2010 | Buccafusca |
| 2010/0199232 A1 | 8/2010 | Mistry |
| 2010/0231508 A1 | 9/2010 | Cruz-Hernandez |
| 2010/0262008 A1 | 10/2010 | Roundhill |
| 2010/0302015 A1 | 12/2010 | Kipman |
| 2010/0321216 A1 | 12/2010 | Jonsson |
| 2011/0006888 A1 | 1/2011 | Bae |
| 2011/0010958 A1 | 1/2011 | Clark |
| 2011/0051554 A1 | 3/2011 | Varray |
| 2011/0066032 A1 | 3/2011 | Vitek |
| 2011/0134225 A1 | 6/2011 | Saint-Pierre |
| 2011/0199342 A1 | 8/2011 | Vartanian |
| 2011/0310028 A1 | 12/2011 | Camp, Jr. |
| 2012/0057733 A1 | 3/2012 | Morii |
| 2012/0063628 A1 | 3/2012 | Rizzello |
| 2012/0066280 A1 | 3/2012 | Tsutsui |
| 2012/0113223 A1 | 5/2012 | Hilliges |
| 2012/0223880 A1 | 9/2012 | Birnbaum |
| 2012/0229400 A1 | 9/2012 | Birnbaum |
| 2012/0229401 A1 | 9/2012 | Birnbaum |
| 2012/0236689 A1 | 9/2012 | Brown |
| 2012/0243374 A1 | 9/2012 | Dahl |
| 2012/0249409 A1 | 10/2012 | Toney |
| 2012/0249474 A1 | 10/2012 | Pratt |
| 2012/0299853 A1 | 11/2012 | Dagar |
| 2012/0307649 A1 | 12/2012 | Park |
| 2012/0315605 A1 | 12/2012 | Cho |
| 2013/0035582 A1 | 2/2013 | Radulescu |
| 2013/0079621 A1 | 3/2013 | Shoham |
| 2013/0094678 A1 | 4/2013 | Scholte |
| 2013/0100008 A1 | 4/2013 | Marti |
| 2013/0101141 A1 | 4/2013 | McElveen |
| 2013/0173658 A1 | 7/2013 | Adelman |
| 2013/0271397 A1 | 10/2013 | MacDougall |
| 2013/0331705 A1 | 12/2013 | Fraser |
| 2014/0027201 A1 | 1/2014 | Islam |
| 2014/0104274 A1 | 4/2014 | Hilliges |
| 2014/0139071 A1 | 5/2014 | Yamamoto |
| 2014/0168091 A1 | 6/2014 | Jones |
| 2014/0201666 A1 | 7/2014 | Bedikian |
| 2014/0204002 A1 | 7/2014 | Bennet |
| 2014/0265572 A1 | 9/2014 | Siedenburg |
| 2014/0267065 A1 | 9/2014 | Levesque |
| 2014/0269207 A1 | 9/2014 | Baym |
| 2014/0269208 A1 | 9/2014 | Baym |
| 2014/0269214 A1 | 9/2014 | Baym |
| 2014/0270305 A1 | 9/2014 | Baym |
| 2014/0306891 A1 | 10/2014 | Latta |
| 2014/0320436 A1 | 10/2014 | Modarres |
| 2014/0361988 A1 | 12/2014 | Katz |
| 2014/0369514 A1 | 12/2014 | Baym |
| 2015/0002477 A1 | 1/2015 | Cheatham, III |
| 2015/0002517 A1 | 1/2015 | Lee |
| 2015/0005039 A1 | 1/2015 | Liu |
| 2015/0006645 A1 | 1/2015 | Oh |
| 2015/0007025 A1 | 1/2015 | Sassi |
| 2015/0013023 A1 | 1/2015 | Wang |
| 2015/0019299 A1 | 1/2015 | Harvey |
| 2015/0022466 A1 | 1/2015 | Levesque |
| 2015/0029155 A1 | 1/2015 | Lee |
| 2015/0066445 A1 | 3/2015 | Lin |
| 2015/0070147 A1 | 3/2015 | Cruz-Hernandez |
| 2015/0070245 A1 | 3/2015 | Han |
| 2015/0078136 A1 | 3/2015 | Sun |
| 2015/0081110 A1 | 3/2015 | Houston |
| 2015/0084929 A1 | 3/2015 | Lee |
| 2015/0110310 A1 | 4/2015 | Minnaar |
| 2015/0130323 A1 | 5/2015 | Harris |
| 2015/0168205 A1 | 6/2015 | Lee |
| 2015/0187134 A1 | 7/2015 | Baecher |
| 2015/0192995 A1 | 7/2015 | Subramanian |
| 2015/0209564 A1 | 7/2015 | Lewin |
| 2015/0220199 A1 | 8/2015 | Wang |
| 2015/0226537 A1 | 8/2015 | Schorre |
| 2015/0226831 A1 | 8/2015 | Nakamura |
| 2015/0241393 A1 | 8/2015 | Ganti |
| 2015/0248787 A1 | 9/2015 | Abovitz |
| 2015/0258431 A1 | 9/2015 | Stafford |
| 2015/0277610 A1 | 10/2015 | Kim |
| 2015/0293592 A1 | 10/2015 | Cheong |
| 2015/0304789 A1 | 10/2015 | Babayoff |
| 2015/0309629 A1 | 10/2015 | Amariutei |
| 2015/0323667 A1 | 11/2015 | Przybyla |
| 2015/0331576 A1 | 11/2015 | Piya |
| 2015/0332075 A1 | 11/2015 | Burch |
| 2016/0019762 A1 | 1/2016 | Levesque |
| 2016/0019879 A1 | 1/2016 | Daley |
| 2016/0026253 A1 | 1/2016 | Bradski |
| 2016/0044417 A1 | 2/2016 | Clemen, Jr. |
| 2016/0124080 A1 | 5/2016 | Carter |
| 2016/0138986 A1 | 5/2016 | Carlin |
| 2016/0175701 A1 | 6/2016 | Froy |
| 2016/0175709 A1 | 6/2016 | Idris |
| 2016/0189702 A1 | 6/2016 | Blanc |

(56) References Cited

U.S. PATENT DOCUMENTS

| | | |
|---|---|---|
| 2016/0242724 A1 | 8/2016 | Lavallee |
| 2016/0246374 A1 | 8/2016 | Carter |
| 2016/0249150 A1 | 8/2016 | Carter |
| 2016/0291716 A1 | 10/2016 | Boser |
| 2016/0306423 A1 | 10/2016 | Uttermann |
| 2016/0320843 A1 | 11/2016 | Long |
| 2016/0339132 A1 | 11/2016 | Cosman |
| 2016/0358477 A1 | 12/2016 | Ansari |
| 2016/0374562 A1 | 12/2016 | Vertikov |
| 2017/0002839 A1 | 1/2017 | Bukland |
| 2017/0004819 A1 | 1/2017 | Ochiai |
| 2017/0018171 A1 | 1/2017 | Carter |
| 2017/0024921 A1 | 1/2017 | Beeler |
| 2017/0052148 A1 | 2/2017 | Estevez |
| 2017/0123487 A1 | 5/2017 | Hazra |
| 2017/0123499 A1 | 5/2017 | Eid |
| 2017/0140552 A1 | 5/2017 | Woo |
| 2017/0144190 A1 | 5/2017 | Hoshi |
| 2017/0153707 A1 | 6/2017 | Subramanian |
| 2017/0168586 A1 | 6/2017 | Sinha |
| 2017/0181725 A1 | 6/2017 | Han |
| 2017/0193768 A1 | 7/2017 | Long |
| 2017/0193823 A1 | 7/2017 | Jiang |
| 2017/0211022 A1 | 7/2017 | Reinke |
| 2017/0236506 A1 | 8/2017 | Przybyla |
| 2017/0249932 A1 | 8/2017 | Maxwell |
| 2017/0270356 A1 | 9/2017 | Sills |
| 2017/0279951 A1 | 9/2017 | Hwang |
| 2017/0336860 A1 | 11/2017 | Smoot |
| 2017/0366908 A1 | 12/2017 | Long |
| 2018/0018787 A1 | 1/2018 | Giancola |
| 2018/0035891 A1 | 2/2018 | Van Soest |
| 2018/0039333 A1 | 2/2018 | Carter |
| 2018/0047259 A1 | 2/2018 | Carter |
| 2018/0074580 A1 | 3/2018 | Hardee |
| 2018/0081439 A1 | 3/2018 | Daniels |
| 2018/0101234 A1 | 4/2018 | Carter |
| 2018/0139557 A1 | 5/2018 | Ochiai |
| 2018/0146306 A1 | 5/2018 | Benattar |
| 2018/0151035 A1 | 5/2018 | Maalouf |
| 2018/0166063 A1 | 6/2018 | Long |
| 2018/0181203 A1 | 6/2018 | Subramanian |
| 2018/0182372 A1 | 6/2018 | Tester |
| 2018/0190007 A1 | 7/2018 | Panteleev |
| 2018/0246576 A1 | 8/2018 | Long |
| 2018/0253627 A1 | 9/2018 | Baradel |
| 2018/0263708 A1 | 9/2018 | Kim |
| 2018/0267156 A1 | 9/2018 | Carter |
| 2018/0271494 A1 | 9/2018 | Cuscuna |
| 2018/0304310 A1 | 10/2018 | Long |
| 2018/0309515 A1 | 10/2018 | Murakowski |
| 2018/0310111 A1 | 10/2018 | Kappus |
| 2018/0350339 A1 | 12/2018 | Macours |
| 2018/0361174 A1 | 12/2018 | Radulescu |
| 2019/0001129 A1 | 1/2019 | Rosenbluth |
| 2019/0038496 A1 | 2/2019 | Levesque |
| 2019/0091565 A1 | 3/2019 | Nelson |
| 2019/0163275 A1 | 5/2019 | Iodice |
| 2019/0175077 A1 | 6/2019 | Zhang |
| 2019/0187244 A1 | 6/2019 | Riccardi |
| 2019/0196578 A1 | 6/2019 | Iodice |
| 2019/0196591 A1 | 6/2019 | Long |
| 2019/0197840 A1 | 6/2019 | Kappus |
| 2019/0197841 A1 | 6/2019 | Carter |
| 2019/0197842 A1 | 6/2019 | Long |
| 2019/0204925 A1 | 7/2019 | Long |
| 2019/0206202 A1 | 7/2019 | Carter |
| 2019/0235628 A1 | 8/2019 | Lacroix |
| 2019/0257932 A1 | 8/2019 | Carter |
| 2019/0310710 A1 | 10/2019 | Deeley |
| 2019/0342654 A1 | 11/2019 | Buckland |
| 2020/0042091 A1 | 2/2020 | Long |
| 2020/0080776 A1 | 3/2020 | Kappus |
| 2020/0082221 A1 | 3/2020 | Tsai |
| 2020/0082804 A1 | 3/2020 | Kappus |
| 2020/0103974 A1 | 4/2020 | Carter |
| 2020/0117229 A1 | 4/2020 | Long |
| 2020/0117993 A1 | 4/2020 | Martinez-Canales |
| 2020/0193269 A1 | 6/2020 | Park |
| 2020/0218354 A1 | 7/2020 | Beattie |
| 2020/0257371 A1 | 8/2020 | Sung |
| 2020/0285888 A1 | 9/2020 | Borar |
| 2020/0294299 A1 | 9/2020 | Rigiroli |
| 2020/0302760 A1 | 9/2020 | Carter |
| 2020/0320347 A1 | 10/2020 | Nikolenko |
| 2020/0320351 A1 | 10/2020 | Nikolenko |
| 2020/0327418 A1 | 10/2020 | Lyons |
| 2020/0380832 A1 | 12/2020 | Carter |
| 2021/0037332 A1 | 2/2021 | Kappus |
| 2021/0043070 A1 | 2/2021 | Carter |
| 2021/0056693 A1 | 2/2021 | Cheng |
| 2021/0109712 A1 | 4/2021 | Oliver |
| 2021/0111731 A1 | 4/2021 | Oliver |
| 2021/0112353 A1 | 4/2021 | Kappus |
| 2021/0141458 A1 | 5/2021 | Sarafianou |
| 2021/0162457 A1 | 6/2021 | Ebefors |
| 2021/0165491 A1 | 6/2021 | Sun |
| 2021/0170447 A1 | 6/2021 | Buckland |
| 2021/0183215 A1 | 6/2021 | Carter |
| 2021/0201884 A1 | 7/2021 | Kappus |
| 2021/0225355 A1 | 7/2021 | Long |
| 2021/0275141 A1 | 9/2021 | Eckersley |
| 2021/0294419 A1 | 9/2021 | Lee |
| 2021/0303072 A1 | 9/2021 | Carter |
| 2021/0303758 A1 | 9/2021 | Long |
| 2021/0334706 A1 | 10/2021 | Yamaguchi |
| 2021/0381765 A1 | 12/2021 | Kappus |
| 2021/0397261 A1 | 12/2021 | Kappus |
| 2022/0000447 A1 | 1/2022 | Eibl |
| 2022/0035479 A1 | 2/2022 | Lasater |
| 2022/0083142 A1 | 3/2022 | Brown |
| 2022/0095068 A1 | 3/2022 | Kappus |
| 2022/0113806 A1 | 4/2022 | Long |
| 2022/0155949 A1 | 5/2022 | Ring |
| 2022/0198892 A1 | 6/2022 | Carter |
| 2022/0236806 A1 | 7/2022 | Carter |
| 2022/0252550 A1 | 8/2022 | Catsis |
| 2022/0300028 A1 | 9/2022 | Long |
| 2022/0300070 A1 | 9/2022 | Iodice |
| 2022/0329250 A1 | 10/2022 | Long |
| 2022/0393095 A1 | 12/2022 | Chilles |
| 2023/0036123 A1 | 2/2023 | Long |
| 2023/0075917 A1 | 3/2023 | Pittera |
| 2023/0087395 A1 | 3/2023 | Borar |
| 2023/0117919 A1 | 4/2023 | Iodice |
| 2023/0124704 A1 | 4/2023 | Rorke |
| 2023/0141896 A1 | 5/2023 | Liu |
| 2023/0168228 A1 | 6/2023 | Kappus |
| 2023/0215248 A1 | 7/2023 | Lowther |
| 2023/0251720 A1 | 8/2023 | Wren |
| 2023/0259213 A1 | 8/2023 | Long |
| 2023/0298444 A1 | 9/2023 | Kappus |
| 2023/0360504 A1 | 11/2023 | Kappus |
| 2023/0368771 A1 | 11/2023 | Kappus |
| 2023/0378966 A1 | 11/2023 | Long |
| 2024/0021072 A1 | 1/2024 | Carter |
| 2024/0036652 A1 | 2/2024 | Yamada |
| 2024/0056655 A1 | 2/2024 | Page |
| 2024/0069640 A1 | 2/2024 | Long |
| 2024/0095953 A1 | 3/2024 | Lyons |
| 2024/0096183 A1 | 3/2024 | Carter |
| 2024/0129655 A1 | 4/2024 | Chilles |
| 2024/0135789 A1 | 4/2024 | Long |
| 2024/0157399 A1 | 5/2024 | Buckland |
| 2024/0231492 A1 | 7/2024 | Beattie |
| 2024/0265907 A1 | 8/2024 | Long |
| 2024/0288945 A1 | 8/2024 | Long |
| 2024/0296825 A1 | 9/2024 | Long |
| 2024/0402809 A1 | 12/2024 | Kappus |

(56) References Cited

U.S. PATENT DOCUMENTS

| | | | |
|---|---|---|---|
| 2024/0402996 | A1 | 12/2024 | Long |
| 2024/0411374 | A1 | 12/2024 | Wren |

FOREIGN PATENT DOCUMENTS

| | | | |
|---|---|---|---|
| CN | 101986787 | | 3/2011 |
| CN | 102459900 | | 5/2012 |
| CN | 102591512 | | 7/2012 |
| CN | 103797379 | | 5/2014 |
| CN | 103984414 | A | 8/2014 |
| CN | 107340871 | A | 11/2017 |
| CN | 107407969 | A | 11/2017 |
| CN | 107534810 | A | 1/2018 |
| CN | 108780642 | A | 11/2018 |
| CN | 116034422 | A | 4/2023 |
| EP | 0057594 | A2 | 8/1982 |
| EP | 309003 | | 3/1989 |
| EP | 0696670 | A1 | 2/1996 |
| EP | 1875081 | A1 | 1/2008 |
| EP | 1911530 | | 4/2008 |
| EP | 2271129 | A1 | 1/2011 |
| EP | 1461598 | B1 | 4/2014 |
| EP | 3207817 | A1 | 8/2017 |
| EP | 3216231 | B1 | 8/2019 |
| EP | 3916525 | | 12/2021 |
| GB | 2464117 | | 4/2010 |
| GB | 2513884 | A | 11/2014 |
| GB | 2530036 | | 3/2016 |
| JP | 2008074075 | | 4/2008 |
| JP | 2010109579 | | 5/2010 |
| JP | 2011172074 | | 9/2011 |
| JP | 2012048378 | A | 3/2012 |
| JP | 5477736 | B2 | 4/2014 |
| JP | 2015035657 | A | 2/2015 |
| JP | 2016035646 | | 3/2016 |
| JP | 2017168086 | | 9/2017 |
| JP | 6239796 | | 11/2017 |
| KR | 20120065779 | | 6/2012 |
| KR | 20130055972 | | 5/2013 |
| KR | 1020130055972 | | 5/2013 |
| KR | 20160008280 | | 1/2016 |
| KR | 20200082449 | A | 7/2020 |
| TW | 201308837 | | 2/2013 |
| WO | 9118486 | | 11/1991 |
| WO | 9639754 | | 12/1996 |
| WO | 03050511 | A | 6/2003 |
| WO | 2005017965 | | 2/2005 |
| WO | 2007144801 | A2 | 12/2007 |
| WO | 2009071746 | A1 | 6/2009 |
| WO | 2009112866 | | 9/2009 |
| WO | 2010003836 | | 1/2010 |
| WO | 2010139916 | | 12/2010 |
| WO | 2011132012 | A1 | 10/2011 |
| WO | 2012023864 | | 2/2012 |
| WO | 2012104648 | A1 | 8/2012 |
| WO | 2013179179 | | 12/2013 |
| WO | 2014181084 | A1 | 11/2014 |
| WO | 2015006467 | | 1/2015 |
| WO | 2015039622 | | 3/2015 |
| WO | 2015127335 | | 8/2015 |
| WO | 2015194510 | X | 12/2015 |
| WO | 2016007920 | | 1/2016 |
| WO | 2016073936 | | 5/2016 |
| WO | 2016095033 | A1 | 6/2016 |
| WO | 2016099279 | | 6/2016 |
| WO | 2016132141 | | 8/2016 |
| WO | 2016132144 | | 8/2016 |
| WO | 2016137675 | | 9/2016 |
| WO | 2016162058 | | 10/2016 |
| WO | 2016171651 | | 10/2016 |
| WO | 2017172006 | | 10/2017 |
| WO | 2018000731 | A1 | 1/2018 |
| WO | 2018109466 | A1 | 6/2018 |
| WO | 2018168562 | A1 | 9/2018 |
| WO | 2019190894 | | 10/2019 |
| WO | 2020049321 | A2 | 3/2020 |
| WO | 2021130505 | A1 | 7/2021 |
| WO | 2021260373 | A1 | 12/2021 |
| WO | 2021262343 | | 12/2021 |

OTHER PUBLICATIONS

Notice of Allowance dated Feb. 10, 2020, for U.S. Appl. No. 16/160,862 (pp. 1-9).
Notice of Allowance dated Feb. 7, 2019 for U.S. Appl. No. 15/851,214 (pp. 1-7).
Notice of Allowance dated Jul. 22, 2021 for U.S. Appl. No. 16/600,500 (pp. 1-9).
Notice of Allowance dated Jul. 31, 2019 for U.S. Appl. No. 15/851,214 (pp. 1-9).
Notice of Allowance dated Jul. 31, 2019 for US App. No. 16/296,127 (pp. 1-9).
Notice of Allowance dated Jun. 10, 2021 for U.S. Appl. No. 17/092,333 (pp. 1-9).
Notice of Allowance dated Jun. 17, 2020 for U.S. Appl. No. 15/210,661 (pp. 1-9).
Notice of Allowance dated Jun. 25, 2021 for U.S. Appl. No. 15/396,851 (pp. 1-10).
Notice of Allowance dated May 30, 2019 for U.S. Appl. No. 15/966,213 (pp. 1-9).
Notice of Allowance dated Nov. 5, 2021 for U.S. Appl. No. 16/899,720 (pp. 1-9).
Notice of Allowance dated Oct. 1, 2020 for U.S. Appl. No. 15/897,804 (pp. 1-9).
Notice of Allowance dated Oct. 16, 2020 for U.S. Appl. No. 16/159,695 (pp. 1-7).
Notice of Allowance dated Oct. 30, 2020 for US App. No. 15/839,184 (pp. 1-9).
Notice of Allowance dated Oct. 6, 2020 for U.S. Appl. No. 16/699,629 (pp. 1-8).
Notice of Allowance dated Sep. 30, 2020 for US App. No. 16/401,148 (pp. 1-10).
Notice of Allowance in U.S. Appl. No. 15/210,661 dated Jun. 17, 2020 (22 pages).
Obrist et al., Emotions Mediated Through Mid-Air Haptics, CHI 2015, Apr. 18-23, 2015, Seoul, Republic of Korea. (10 pages).
Obrist et al., Talking about Tactile Experiences, CHI 2013, Apr. 27-May 2, 2013 (10 pages).
Office Action (Ex Parte Quayle Action) dated Jan. 6, 2023 for U.S. Appl. No. 17/195,795 (pp. 1-6).
Office Action (Final Rejection) dated Jan. 9, 2023 for U.S. Appl. No. 16/144,474 (pp. 1-16).
Office Action (Final Rejection) dated Mar. 14, 2022 for U.S. Appl. No. 16/564,016 (pp. 1-12).
Office Action (Final Rejection) dated Mar. 21, 2023 for U.S. Appl. No. 16/995,819 (pp. 1-7).
Office Action (Final Rejection) dated Sep. 16, 2022 for U.S. Appl. No. 16/404,660 (pp. 1-6).
Office Action (Final Rejection) dated Nov. 18, 2022 for U.S. Appl. No. 16/228,767 (pp. 1-27).
Office Action (Final Rejection) dated Nov. 18, 2022 for U.S. Appl. No. 17/068,831 (pp. 1-9).
Office Action (Final Rejection) dated Dec. 8, 2022 for U.S. Appl. No. 16/229,091 (pp. 1-9).
Office Action (Final Rejection) dated Dec. 15, 2022 for U.S. Appl. No. 16/843,281 (pp. 1-25).
Office Action (Non-Final Rejection) dated Jan. 21, 2022 for U.S. Appl. No. 17/068,834 (pp. 1-12).
Office Action (Non-Final Rejection) dated Jan. 24, 2022 for U.S. Appl. No. 16/228,767 (pp. 1-22).
Office Action (Non-Final Rejection) dated Mar. 1, 2023 for U.S. Appl. No. 16/564,016 (pp. 1-10).
Office Action (Non-Final Rejection) dated Mar. 4, 2022 for U.S. Appl. No. 16/404,660 (pp. 1-5).
Office Action (Non-Final Rejection) dated Mar. 15, 2022 for U.S. Appl. No. 16/144,474 (pp. 1-13).

(56) References Cited

OTHER PUBLICATIONS

Office Action (Non-Final Rejection) dated Mar. 22, 2023 for U.S. Appl. No. 17/354,636 (pp. 1-5).
Office Action (Non-Final Rejection) dated Apr. 1, 2022 for U.S. Appl. No. 16/229,091 (pp. 1-10).
Office Action (Non-Final Rejection) dated May 2, 2022 for U.S. Appl. No. 17/068,831 (pp. 1-10).
Office Action (Non-Final Rejection) dated May 25, 2022 for U.S. Appl. No. 16/843,281 (pp. 1-28).
Office Action (Non-Final Rejection) dated Jun. 9, 2022 for U.S. Appl. No. 17/080,840 (pp. 1-9).
Office Action (Non-Final Rejection) dated Jun. 27, 2022 for U.S. Appl. No. 16/198,959 (pp. 1-17).
Office Action (Non-Final Rejection) dated Jun. 27, 2022 for U.S. Appl. No. 16/734,479 (pp. 1-13).
Office Action (Non-Final Rejection) dated Aug. 29, 2022 for U.S. Appl. No. 16/995,819 (pp. 1-6).
Office Action (Non-Final Rejection) dated Sep. 21, 2022 for U.S. Appl. No. 17/721,315 (pp. 1-10).
Office Action (Non-Final Rejection) dated Oct. 17, 2022 for U.S. Appl. No. 17/807,730 (pp. 1-8).
Office Action (Non-Final Rejection) dated Nov. 9, 2022 for U.S. Appl. No. 17/454,823 (pp. 1-16).
Office Action (Non-Final Rejection) dated Nov. 16, 2022 for U.S. Appl. No. 17/134,505 (pp. 1-7).
Office Action (Non-Final Rejection) dated Nov. 16, 2022 for U.S. Appl. No. 17/692,852 (pp. 1-4).
Office Action (Non-Final Rejection) dated Dec. 6, 2022 for U.S. Appl. No. 17/409,783 (pp. 1-7).
Office Action (Non-Final Rejection) dated Dec. 20, 2021 for U.S. Appl. No. 17/195,795 (pp. 1-7).
Office Action (Non-Final Rejection) dated Dec. 22, 2022 for U.S. Appl. No. 17/457,663 (pp. 1-20).
Office Action (Notice of Allowance and Fees Due (PTOL-85) dated Jan. 18, 2022 for U.S. Appl. No. 16/899,720 (pp. 1-2).
Office Action (Notice of Allowance and Fees Due (PTOL-85)) dated Feb. 11, 2022 for U.S. Appl. No. 16/228,760 (pp. 1-8).
Office Action (Notice of Allowance and Fees Due (PTOL-85) dated Feb. 28, 2022 for U.S. Appl. No. 17/068,825 (pp. 1-7).
Office Action (Notice of Allowance and Fees Due (PTOL-85) dated Mar. 7, 2022 for U.S. Appl. No. 16/600,496 (pp. 1-5).
Office Action (Notice of Allowance and Fees Due (PTOL-85)) dated Mar. 8, 2023 for U.S. Appl. No. 17/721,315 (pp. 1-8).
Office Action (Notice of Allowance and Fees Due (PTOL-85)) dated Mar. 15, 2023 for U.S. Appl. No. 17/134,505 (pp. 1-5).
Office Action (Notice of Allowance and Fees Due (PTOL-85)) dated Mar. 24, 2023 for U.S. Appl. No. 17/080,840 (pp. 1-8).
Office Action (Notice of Allowance and Fees Due (PTOL-85)) dated Apr. 4, 2023 for U.S. Appl. No. 17/409,783 (pp. 1-5).
Office Action (Notice of Allowance and Fees Due (PTOL-85)) dated Apr. 6, 2023 for U.S. Appl. No. 17/807,730 (pp. 1-7).
Office Action (Notice of Allowance and Fees Due (PTOL-85) dated Aug. 24, 2022 for U.S. Appl. No. 16/198,959 (pp. 1-6).
Office Action (Notice of Allowance and Fees Due (PTOL-85)) dated Aug. 31, 2022 for U.S. Appl. No. 16/198,959 (pp. 1-2).
Office Action (Notice of Allowance and Fees Due (PTOL-85)) dated Sep. 7, 2022 for U.S. Appl. No. 17/068,834 (pp. 1-8).
Office Action (Notice of Allowance and Fees Due (PTOL-85)) dated Sep. 8, 2022 for U.S. Appl. No. 17/176,899 (pp. 1-8).
Office Action (Notice of Allowance and Fees Due (PTOL-85)) dated Sep. 12, 2022 for U.S. Appl. No. 16/734,479 (pp. 1-7).
Office Action (Notice of Allowance and Fees Due (PTOL-85)) dated Oct. 31, 2022 for U.S. Appl. No. 17/068,834 (pp. 1-2).
Office Action (Notice of Allowance and Fees Due (PTOL-85)) dated Oct. 31, 2022 for U.S. Appl. No. 17/176,899 (pp. 1-2).
Office Action (Notice of Allowance and Fees Due (PTOL-85) dated Nov. 1, 2022 for U.S. Appl. No. 16/404,660 (pp. 1-5).
Office Action (Notice of Allowance and Fees Due (PTOL-85)) dated Nov. 2, 2022 for U.S. Appl. No. 16/734,479 (pp. 1-2).
Office Action (Notice of Allowance and Fees Due (PTOL-85)) dated Nov. 10, 2022 for U.S. Appl. No. 16/198,959 (pp. 1-2).
Office Action (Notice of Allowance and Fees Due (PTOL-85)) dated Nov. 16, 2022 for U.S. Appl. No. 16/404,660 (pp. 1-2).
Office Action (Notice of Allowance and Fees Due (PTOL-85)) dated Dec. 14, 2021 for U.S. Appl. No. 17/170,841 (pp. 1-8).
Office Action dated Feb. 9, 2023 for U.S. Appl. No. 18/060,556 (pp. 1-5).
Office Action dated Mar. 3, 2023 for U.S. Appl. No. 18/060,525 (pp. 1-12).
Office Action dated Apr. 8, 2020, for U.S. Appl. No. 16/198,959 (pp. 1-17).
Office Action dated Apr. 16, 2020 for U.S. Appl. No. 15/839,184 (pp. 1-8).
Office Action dated Apr. 17, 2020 for U.S. Appl. No. 16/401,148 (pp. 1-15).
Office Action dated Apr. 18, 2019 for U.S. Appl. No. 16/296,127 (pp. 1-6).
Office Action dated Apr. 28, 2020 for U.S. Appl. No. 15/396,851 (pp. 1-12).
Office Action dated Apr. 29, 2020 for U.S. Appl. No. 16/374,301 (pp. 1-18).
Office Action dated Apr. 4, 2019 for U.S. Appl. No. 15/897,804 (pp. 1-10).
Office Action dated Aug. 10, 2021 for U.S. Appl. No. 16/564,016 (pp. 1-14).
Office Action dated Aug. 19, 2021 for U.S. Appl. No. 17/170,841 (pp. 1-9).
Office Action dated Aug. 22, 2019 for U.S. Appl. No. 16/160,862 (pp. 1-5).
Office Action dated Aug. 9, 2021 for U.S. Appl. No. 17/068,825 (pp. 1-9).
Office Action dated Dec. 11, 2019 for U.S. Appl. No. 15/959,266 (pp. 1-15).
Office Action dated Dec. 7, 2020 for U.S. Appl. No. 16/563,608 (pp. 1-8).
Office Action dated Feb. 20, 2019 for U.S. Appl. No. 15/623,516 (pp. 1-8).
Office Action dated Feb. 25, 2020 for US App. No. 15/960, 113 (pp. 1-7).
Office Action dated Feb. 7, 2020 for U.S. Appl. No. 16/159,695 (pp. 1-8).
Office Action dated Jan. 10, 2020 for U.S. Appl. No. 16/228,767 (pp. 1-6).
Office Action dated Jan. 29, 2020 for U.S. Appl. No. 16/198,959 (p. 1-6).
Office Action dated Jul. 10, 2019 for U.S. Appl. No. 15/210,661 (pp. 1-12).
Office Action dated Jul. 26, 2019 for U.S. Appl. No. 16/159,695 (pp. 1-8).
Office Action dated Jul. 9, 2020 for U.S. Appl. No. 16/228,760 (pp. 1-17).
Office Action dated Jun. 19, 2020 for U.S. Appl. No. 16/699,629 (pp. 1-12).
Office Action dated Jun. 25, 2020 for U.S. Appl. No. 16/228,767 (pp. 1-27).
Office Action dated Jun. 25, 2021 for U.S. Appl. No. 16/899,720 (pp. 1-5).
Office Action dated Mar. 11, 2021 for U.S. Appl. No. 16/228,767 (pp. 1-23).
Office Action dated Mar. 20, 2020 for U.S. Appl. No. 15/210,661 (pp. 1-10).
Office Action dated Mar. 31, 2021 for U.S. Appl. No. 16/228,760 (pp. 1-21).
Office Action dated May 13, 2021 for U.S. Appl. No. 16/600,500 (pp. 1-9).
EPO ISR and WO for PCT/GB2022/050204 (Apr. 7, 2022) (15 pages).
EPO Office Action for EP16708440.9 dated Sep. 12, 2018 (7 pages).
EPSRC Grant summary EP/J004448/1 (2011) (1 page).
Eric Tzeng et al., Adversarial Discriminative Domain Adaptation, Feb. 17, 2017, pp. 1-10.

(56) References Cited

OTHER PUBLICATIONS

European Office Action for Application No. EP16750992.6, dated Oct. 2, 2019, 3 pages.
Ex Parte Quayle Action dated Dec. 28, 2018 for U.S. Appl. No. 15/966,213 (pp. 1-7).
Extended European Search Report for Application No. EP19169929.7, dated Aug. 6, 2019, 7 pages.
Freeman et al., Tactile Feedback for Above-Device Gesture Interfaces: Adding Touch to Touchless Interactions ICMI'14, Nov. 12-16, 2014, Istanbul, Turkey (8 pages).
Gareth Young et al.. Designing Mid-Air Haptic Gesture Controlled User Interfaces for Cars, PACM on Human-Computer Interactions, Jun. 2020 (24 pages).
Gavrilov L R et al (2000) "A theoretical assessment of the relative performance of spherical phased arrays for ultrasound surgery" Ultrasonics, Ferroelectrics, and Frequency Control, IEEE Transactions on (vol. 47, Issue: 1), pp. 125-139.
Gavrilov, L.R. (2008) "The Possibility of Generating Focal Regions of Complex Configurations in Application to the Problems of Stimulation of Human Receptor Structures by Focused Ultrasound" Acoustical Physics, vol. 54, No. 2, pp. 269-278.
Georgiou et al., Haptic In-Vehicle Gesture Controls, Adjunct Proceedings of the 9th International ACM Conference on Automotive User Interfaces and Interactive Vehicular Applications (AutomotiveUI '17), Sep. 24-27, 2017 (6 pages).
GitHub—danfis/libccd: Library for collision detection between two convex shapes, Mar. 26, 2020, pp. 1-6.
GitHub—IntelRealSense/hand_tracking_samples: researc codebase for depth-based hand pose estimation using dynamics based tracking and CNNs, Mar. 26, 2020, 3 pages.
Gokturk, et al., "A Time-of-Flight Depth Sensor-System Description, Issues and Solutions," Published in: 2004 Conference on Computer Vision and Pattern Recognition Workshop, Date of Conference: Jun. 27-Jul. 2, 2004, 9 pages.
Guez, "Solution to the inverse kinematic problem in robotics by neural networks." In Proceedings of the 2nd International Conference on Neural Networks, 1988. San Diego, California. (Year: 1988) 8 pages.
Hasegawa, K. and Shinoda, H. (2013) "Aerial Display of Vibrotactile Sensation with High Spatial-Temporal Resolution using Large Aperture Airbourne Ultrasound Phased Array", University of Tokyo (6 pages).
Henneberg, J., Gerlach, A., Storck, H., Cebulla, H., & Marburg, S. (2018). Reducing mechanical cross-coupling in phased array transducers using stop band material as backing. Journal of Sound and Vibration, 424, 352-364.
Henrik Bruus, Acoustofluidics 2: Perturbation theory and ultrasound resonance modes, Lab Chip, 2012, 12, 20-28.
Hilleges et al. Interactions in the air: adding further depth to interactive tabletops, UIST '09: Proceedings of the 22nd annual ACM symposium on User interface software and technology Oct. 2009 pp. 139-148.
Hoshi et al., Tactile Presentation by Airborne Ultrasonic Oscillator Array, Proceedings of Robotics and Mechatronics Lecture 2009, Japan Society of Mechanical Engineers; May 24, 2009 (5 pages).
Hoshi T et al, "Noncontact Tactile Display Based on Radiation Pressure of Airborne Ultrasound", IEEE Transactions on Haptics, IEEE, USA, (Jul. 1, 2010), vol. 3, No. 3, ISSN 1939-1412, pp. 155-165.
Hoshi, T., Development of Aerial-Input and Aerial-Tactile-Feedback System, IEEE World Haptics Conference 2011, p. 569-573.
Hoshi, T., Handwriting Transmission System Using Noncontact Tactile Display, IEEE Haptics Symposium 2012 pp. 399-401.
Hoshi, T., Non-contact Tactile Sensation Synthesized by Ultrasound Transducers, Third Joint Euro haptics Conference and Symposium on Haptic Interfaces for Virtual Environment and Teleoperator Systems 2009 (5 pages).
Hoshi, T., Touchable Holography, SIGGRAPH 2009, New Orleans, Louisiana, Aug. 3-7, 2009. (1 page).
https://radiopaedia.org/articles/physical-principles-of-ultrasound-1?lang=gb (Accessed May 29, 2022).
Hua J, Qin H., Haptics-based dynamic implicit solid modeling, IEEE Trans Vis Comput Graph. Sep.-Oct. 2004;10 (5):574-86.
Hyunjae Gil, Whiskers: Exploring the Use of Ultrasonic Haptic Cues on the Face, CHI 2018, Apr. 21-26, 2018, Montréal, QC, Canada.
Iddan, et al., "3D Imaging in the Studio (And Elsewhwere . . ." Apr. 2001, 3DV systems Ltd., Yokneam, Isreal, www.3dvsystems.com.il, 9 pages.
Imaginary Phone: Learning Imaginary Interfaces by Transferring Spatial Memory From a Familiar Device Sean Gustafson, Christian Holz and Patrick Baudisch. UIST 2011. (10 pages).
IN 202047026493 Office Action dated Mar. 8, 2022, 6 pages.
India Morrison, The skin as a social organ, Exp Brain Res (2010) 204:305-314.
International Preliminary Report on Patentability and Written Opinion issued in corresponding PCT/US2017/035009, dated Dec. 4, 2018, 8 pages.
International Preliminary Report on Patentability for Application No. PCT/EP2017/069569 dated Feb. 5, 2019, 11 pages.
International Search Report and Written Opinion for App. No. PCT/GB2021/051590, dated Nov. 11, 2021, 20 pages.
International Search Report and Written Opinion for Application No. PCT/GB2018/053738, date of mailing Apr. 11, 2019, 14 pages.
International Search Report and Written Opinion for Application No. PCT/GB2018/053739, date of mailing Jun. 4, 2019, 16 pages.
International Search Report and Written Opinion for Application No. PCT/GB2019/050969, date of mailing Jun. 13, 2019, 15 pages.
International Search Report and Written Opinion for Application No. PCT/GB2019/051223, date of mailing Aug. 8, 2019, 15 pages.
International Search Report and Written Opinion for Application No. PCT/GB2019/052510, date of mailing Jan. 14, 2020, 25 pages.
Invitation to Pay Additional Fees for PCT/GB2022/051821 (Oct. 20, 2022), 15 pages.
ISR & WO for PCT/GB2020/052545 (Jan. 27, 2021) 14 pages.
ISR & WO For PCT/GB2021/052946, 15 pages.
ISR & WO for PCT/GB2022/051388 (Aug. 30, 2022) (15 pages).
ISR and WO for PCT/GB2020/050013 (Jul. 13, 2020) (20 pages).
ISR and WO for PCT/GB2020/050926 (Jun. 2, 2020) (16 pages).
ISR and WO for PCT/GB2020/052544 (Dec. 18, 2020) (14 pages).
ISR and WO for PCT/GB2020/052829 (Feb. 10, 2021) (15 pages).
ISR and WO for PCT/GB2021/052415 (Dec. 22, 2021) (16 pages).
Office Action (Non-Final Rejection) dated Apr. 19, 2023 for U.S. Appl. No. 18/066,267 (pp. 1-11).
Office Action (Non-Final Rejection) dated Apr. 27, 2023 for U.S. Appl. No. 16/229,091 (pp. 1-5).
Office Action (Non-Final Rejection) dated May 8, 2023 for U.S. Appl. No. 18/065,603 (pp. 1-17).
Office Action (Non-Final Rejection) dated May 10, 2023 for U.S. Appl. No. 17/477,536 (pp. 1-13).
Office Action (Notice of Allowance and Fees Due (PTOL-85)) dated Apr. 28, 2023 for U.S. Appl. No. 17/195,795 (pp. 1-7).
Office Action (Notice of Allowance and Fees Due (PTOL-85)) dated May 12, 2023 for U.S. Appl. No. 16/229,091 (pp. 1-8).
Office Action (Notice of Allowance and Fees Due (PTOL-85)) dated May 24, 2023 for U.S. Appl. No. 16/229,091 (pp. 1-2).
Office Action dated Apr. 19, 2023 for U.S. Appl. No. 18/066,267 (pp. 1-11).
"Welcome to Project Soli" video, https://atap.google.com/#project-soli Accessed Nov. 30, 2018, 2 pages.
A. B. Vallbo, Receptive field characteristics of tactile units with myelinated afferents in hairy skin of human subjects, Journal of Physiology (1995), 483.3, pp. 783-795.
A. Sand, Head-Mounted Display with Mid-Air Tactile Feedback, Proceedings of the 21st ACM Symposium on Virtual Reality Software and Technology, Nov. 13-15, 2015 (8 pages).
Aksel Sveier et al.,Pose Estimation with Dual Quaternions and Iterative Closest Point, 2018 Annual American Control Conference (ACC) (8 pages).
Al-Mashhadany, "Inverse Kinematics Problem (IKP) of 6-DOF Manipulator By Locally Recurrent Neural Networks (LRNNs),"

(56) References Cited

OTHER PUBLICATIONS

Management and Service Science (MASS), International Conference on Management and Service Science., IEEE, Aug. 24, 2010, 5 pages. (Year: 2010).
Alexander, J. et al. (2011), Adding Haptic Feedback to Mobile TV (6 pages).
Almusawi et al., "A new artificial neural network approach in solving inverse kinematics of robotic arm (denso vp6242)." Computational intelligence and neuroscience 2016 (2016). (Year: 2016).
Amanda Zimmerman, The gentle touch receptors of mammalian skin, Science, Nov. 21, 2014, vol. 346 Issue 6212, p. 950.
Anonymous: "How does Ultrahaptics technology work?—Ultrahaptics Developer Information", Jul. 31, 2018 (Jul. 31, 2018), XP055839320, Retrieved from the Internet: URL:https://developer.ultrahaptics.com/knowledgebase/haptics-overview/ [retrieved on Sep. 8, 2021].
Aoki et al., Sound location of stero reproduction with parametric loudspeakers, Applied Acoustics 73 (2012) 1289-1295 7 pages).
Ashish Shrivastava et al., Learning from Simulated and Unsupervised Images through Adversarial Training, Jul. 19, 2017, pp. 1-16.
Azad et al., Deep domain adaptation under deep label scarcity. arXiv preprint arXiv:1809.08097 (2018) (Year: 2018).
Bajard et al., BKM: A New Hardware Algorithm for Complex Elementary Functions, 8092 IEEE Transactions on Computers 43 (1994) (9 pages).
Bajard et al., Evaluation of Complex Elementary Functions / A New Version of BKM, SPIE Conference on Advanced Signal Processing, Jul. 1999 (8 pages).
Benjamin Long et al, "Rendering volumetric haptic shapes in mid-air using ultrasound", ACM Transactions on Graphics (TOG), ACM, US, (Nov. 19, 2014), vol. 33, No. 6, ISSN 0730-0301, pp. 1-10.
Beranek, L., & Mellow, T. (2019). Acoustics: Sound Fields, Transducers and Vibration. Academic Press, 3 pages.
Bortoff et al., Pseudolinearization of the Acrobot using Spline Functions, IEEE Proceedings of the 31st Conference on Decision and Control, Sep. 10, 1992 (6 pages).
Boureau et al.,"A theoretical analysis of feature pooling in visual recognition." In Proceedings of the 27th international conference on machine learning (ICML-10), pp. 111-118. 2010. (Year: 2010).
Bożena Smagowska & Małgorzata Pawlaczyk-Łuszczyńska (2013) Effects of Ultrasonic Noise on the Human Body—A Bibliographic Review, International Journal of Occupational Safety and Ergonomics, 19:2, 195-202.
Brian Kappus and Ben Long, Spatiotemporal Modulation for Mid-Air Haptic Feedback from an Ultrasonic Phased Array, ICSV25, Hiroshima, Jul. 8-12, 2018, 6 pages.
Bybi, A., Grondel, S., Mzerd, A., Granger, C., Garoum, M., & Assaad, J. (2019). Investigation of cross-coupling in piezoelectric transducer arrays and correction. International Journal of Engineering and Technology Innovation, 9(4), 287.
Canada Application 2,909,804 Office Action dated Oct. 18, 2019, 4 pages.
Casper et al., Realtime Control of Multiple-focus Phased Array Heating Patterns Based on Noninvasive Ultrasound Thermography, IEEE Trans Biomed Eng. Jan. 2012; 59(1): 95-105.
Certon, D., Felix, N., Hue, P. T. H., Patat, F., & Lethiecq, M. (1999, October). Evaluation of laser probe performances for measuring cross-coupling in 1-3 piezocomposite arrays. In 1999 IEEE Ultrasonics Symposium. Proceedings. International Symposium (Cat. No. 99CH37027) (vol. 2, pp. 1091-1094).
Certon, D., Felix, N., Lacaze, E., Teston, F., & Patat, F. (2001). Investigation of cross-coupling in 1-3 piezocomposite arrays. IEEE transactions on ultrasonics, ferroelectrics, and frequency control, 48(1), 85-92.
Chang Suk Lee et al., An electrically switchable visible to infra-red dual frequency cholesteric liquid crystal light shutter, J. Mater. Chem. C, 2018, 6, 4243 (7 pages).
Christoper M. Bishop, Pattern Recognition and Machine Learning, 2006, pp. 1-758.
Colgan, A., "How Does the Leap Motion Controller Work?" Leap Motion, Aug. 9, 2014, 10 pages.
Communication Pursuant to Article 94(3) EPC for EP 19723179.8 (Feb. 15, 2022), 10 pages.
Corrected Notice of Allowability dated Aug. 9, 2021 for U.S. Appl. No. 15/396,851 (pp. 1-6).
Corrected Notice of Allowability dated Jan. 14, 2021 for U.S. Appl. No. 15/897,804 (pp. 1-2).
Corrected Notice of Allowability dated Jun. 21, 2019 for U.S. Appl. No. 15/966,213 (2 pages).
Corrected Notice of Allowability dated Nov. 24, 2021 for U.S. Appl. No. 16/600,500 (pp. 1-5).
Corrected Notice of Allowability dated Oct. 31, 2019 for U.S. Appl. No. 15/623,516 (pp. 1-2).
Damn Geeky, "Virtual projection keyboard technology with haptic feedback on palm of your hand, " May 30, 2013, 4 pages.
David Joseph Tan et al., Fits like a Glove: Rapid and Reliable Hand Shape Personalization, 2016 IEEE Conference on Computer Vision and Pattern Recognition, pp. 5610-5619.
Definition of "Interferometry"according to Wikipedia, 25 pages., Retrieved Nov. 2018.
Definition of "Multilateration" according to Wikipedia, 7 pages., Retrieved Nov. 2018.
Definition of "Trilateration"according to Wikipedia, 2 pages., Retrieved Nov. 2018.
Der et al., Inverse kinematics for reduced deformable models. ACM Transactions on graphics (TOG) 25, No. 3 (2006): 1174-1179. (Year: 2006).
Desilets, C. S. (1978). Transducer arrays suitable for acoustic imaging (No. GL-2833). Stanford Univ CA Edward L Ginzton Lab of Physics. 5 pages.
Diederik P. Kingma et al., Adam: A Method for Stochastic Optimization, Jan. 30, 2017, pp. 1-15.
Duka, "Neural network based inverse kinematics solution for trajectory tracking of a robotic arm." Procedia Technology 12 (2014) 20-27. (Year: 2014).
E. Bok, Metasurface for Water-to-Air Sound Transmission, Physical Review Letters 120, 044302 (2018) (6 pages).
E.S. Ebbini et al. (1991), A spherical-section ultrasound phased array applicator for deep localized hyperthermia, Biomedical Engineering, IEEE Transactions on (vol. 38 Issue: 7), pp. 634-643.
EPO 21186570.4 Extended Search Report dated Oct. 29, 2021, 10 pages.
EPO Application 18 725 358.8 Examination Report Dated Sep. 22, 2021, 15 pages.
EPO Communication for Application 18 811 906.9 (Nov. 29, 2021) (15 pages).
EPO Examination Report 17 748 4656.4 (Jan. 12, 2021) (16 pages).
EPO Examination Search Report 17 702 910.5 (Jun. 23, 2021) 10 pages.
Sixth Sense webpage, http://www.pranavmistry.com/projects/sixthsense/ Accessed Nov. 30, 2018, 7 pages.
Stan Melax et al., Dynamics Based 3D Skeletal Hand Tracking, May 22, 2017, pp. 1-8.
Stanley J. Bolanowski, Hairy Skin: Psychophysical Channels and Their Physiological Substrates, Somatosensory and Motor Research, vol. 11. No. 3, 1994, pp. 279-290.
Stefan G. Lechner, Hairy Sensation, Physiology 28: 142-150, 2013.
Steve Guest et al., "Audiotactile interactions in roughness perception", Exp. Brain Res (2002) 146:161-171, DOI 10.1007/s00221-002-1164-z, Received: Feb. 9, 2002/Accepted: May 16, 2002/Published online: Jul. 26, 2002, Springer-Verlag 2002, (11 pages).
Supplemental Notice of Allowability dated Jul. 28, 2021 for U.S. Appl. No. 16/563,608 (pp. 1-2).
Supplemental Notice of Allowability dated Jul. 28, 2021 for U.S. Appl. No. 17/092,333 (pp. 1-2).
Sylvia Gebhardt, Ultrasonic Transducer Arrays for Particle Manipulation (date unknown) (2 pages).
Takaaki Kamigaki, Noncontact Thermal and Vibrotactile Display Using Focused Airborne Ultrasound, EuroHaptics 2020, LNCS 12272, pp. 271-278, 2020.
Takahashi Dean: "Ultrahaptics shows off sense of touch in virtual reality", Dec. 10, 2016 (Dec. 10, 2016), XP055556416, Retrieved

(56) References Cited

OTHER PUBLICATIONS from the Internet: URL: https://venturebeat.com/2016/12/10/ultrahaptics-shows-off-sense-of-touch-in-virtual-reality/ [retrieved on Feb. 13, 2019] 4 pages.
Takahashi, M. et al., Large Aperture Airborne Ultrasound Tactile Display Using Distributed Array Units, SICE Annual Conference 2010 p. 359-62.
Takayuki et al., "Noncontact Tactile Display Based on Radiation Pressure of Airborne Ultrasound" IEEE Transactions on Haptics vol. 3, No. 3, p. 165 (2010).
Teixeira, et al., "A brief introduction to Microsoft's Kinect Sensor," Kinect, 26 pages, retrieved Nov. 2018.
Toby Sharp et al., Accurate, Robust, and Flexible Real-time Hand Tracking, CHI '15, Apr. 18-23, 2015, Seoul, Republic of Korea, ACM 978-1-4503-3145—Jun. 15, 2004, pp. 1-10.
Tom Carter et al, "UltraHaptics: Multi-Point Mid-Air Haptic Feedback for Touch Surfaces", Proceedings of the 26th Annual ACM Symposium on User Interface Software and Technology, UIST '13, New York, New York, USA, (Jan. 1, 2013), ISBN 978-1-45-032268-3, pp. 505-514.
Tom Nelligan and Dan Kass, Intro to Ultrasonic Phased Array (date unknown) (8 pages).
Tomoo Kamakura, Acoustic streaming induced in focused Gaussian beams, J. Acoust. Soc. Am. 97 (5), Pt. 1, May 1995 p. 2740.
Uta Sailer, How Sensory and Affective Attributes Describe Touch Targeting C-Tactile Fibers, Experimental Psychology (2020), 67(4), 224-236.
Vincent Lepetit et al., Model Based Augmentation and Testing of an Annotated Hand Pose Dataset, ResearchGate, https://www.researchgate.net/publication/307910344, Sep. 2016, 13 pages.
Walter, S., Nieweglowski, K., Rebenklau, L., Wolter, K. J., Lamek, B., Schubert, F., . . . & Meyendorf, N. (2008, May). Manufacturing and electrical interconnection of piezoelectric 1-3 composite materials for phased array ultrasonic transducers. In 2008 31st International Spring Seminar on Electronics Technology (pp. 255-260).
Wang et al., Few-shot adaptive faster r-cnn. In Proceedings of the IEEE/CVF Conference on Computer Vision and Pattern Recognition, pp. 7173-7182. 2019. (Year: 2019).
Wang et al., Device-Free Gesture Tracking Using Acoustic Signals, ACM MobiCom '16, pp. 82-94 (13 pages).
Wilson et al., Perception of Ultrasonic Haptic Feedback on the Hand: Localisation and Apparent Motion, CHI 2014, Apr. 26-May 1, 2014, Toronto, Ontario, Canada. (10 pages).
Wooh et al., "Optimum beam steering of linear phased arays," Wave Motion 29 (1999) pp. 245-265, 21 pages.
Xin Cheng et al, "Computation of the acoustic radiation force on a sphere based on the 3-D FDTD method", Piezoelectricity, Acoustic Waves and Device Applications (SPAWDA), 2010 Symposium on, IEEE, (Dec. 10, 2010), ISBN 978-1-4244-9822-2, pp. 236-239.
Xu Hongyi et al, "6-DoF Haptic Rendering Using Continuous Collision Detection between Points and Signed Distance Fields", IEEE Transactions on Haptics, IEEE, USA, vol. 10, No. 2, ISSN 1939-1412, (Sep. 27, 2016), pp. 151-161, (Jun. 16, 2017).
Yang Ling et al, "Phase-coded approach for controllable generation of acoustical vortices", Journal of Applied Physics, American Institute of Physics, US, vol. 113, No. 15, ISSN 0021-8979, (Apr. 21, 2013), pp. 154904-154904.
Yarin Gal et al., Dropout as a Bayesian Approximation: Representing Model Uncertainty in Deep Learning, Oct. 4, 2016, pp. 1-12, Proceedings of the 33rd International Conference on Machine Learning, New York, NY, USA, 2016, JMLR: W&CP vol. 48.
Yaroslav Ganin et al., Domain-Adversarial Training of Neural Networks, Journal of Machine Learning Research 17 (2016) 1-35, submitted May 2015; published Apr. 2016.
Yaroslav Ganin et al., Unsupervised Domain Adaptataion by Backpropagation, Skolkovo Institute of Science and Technology (Skoltech), Moscow Region, Russia, Proceedings of the 32nd International Conference on Machine Learning, Lille, France, 2015, JMLR: W&CP vol. 37, copyright 2015 by the author(s), 11 pages.

Yoshino, K. and Shinoda, H. (2013), "Visio Acoustic Screen for Contactless Touch Interface with Tactile Sensation", University of Tokyo (5 pages).
Zeng, Wejun, "Microsoft Kinect Sensor and Its Effect," IEEE Multimedia, Apr.-Jun. 2012, 7 pages.
Office Action dated May 14, 2021 for U.S. Appl. No. 16/198,959 (pp. 1-6).
Office Action dated May 16, 2019 for U.S. Appl. No. 15/396,851 (pp. 1-7).
Office Action dated May 18, 2020 for U.S. Appl. No. 15/960,113 (pp. 1-21).
Office Action dated Oct. 17, 2019 for U.S. Appl. No. 15/897,804 (pp. 1-10).
Office Action dated Oct. 29, 2021 for U.S. Appl. No. 16/198,959 (pp. 1-7).
Office Action dated Oct. 31, 2019 for U.S. Appl. No. 15/671,107 (pp. 1-6).
Office Action dated Oct. 7, 2019 for U.S. Appl. No. 15/396,851 (pp. 1-9).
Office Action dated Sep. 16, 2021 for U.S. Appl. No. 16/600,496 (pp. 1-8).
Office Action dated Sep. 18, 2020 for U.S. Appl. No. 15/396,851 (pp. 1-14).
Office Action dated Sep. 21, 2020 for U.S. Appl. No. 16/198,959 (pp. 1-17).
Office Action dated Sep. 24, 2021 for U.S. Appl. No. 17/080,840 (pp. 1-9).
OGRECave/ogre—GitHub: ogre/Samples/Media/materials at 7de80a7483f20b50f2b10d7ac6de9d9c6c87d364, Mar. 26, 2020, 1 page.
Oikonomidis et al., "Efficient model-based 3D tracking of hand articulations using Kinect." In BmVC, vol. 1, No. 2, p. 3. 2011. (Year: 2011).
Optimal regularisation for acoustic source reconstruction by inverse methods, Y. Kim, P.A. Nelson, Institute of Sound and Vibration Research, University of Southampton, Southampton, SO17 1BJ, UK Received Feb. 25, 2003; 25 pages.
Oscar Martínez-Graullera et al, "2D array design based on Fermat spiral for ultrasound imaging", Ultrasonics, (Feb. 1, 2010), vol. 50, No. 2, ISSN 0041-624X, pp. 280-289, XP055210119.
Partial International Search Report for Application No. PCT/GB2018/053735, date of mailing Apr. 12, 2019, 14 pages.
Partial ISR for Application No. PCT/GB2020/050013 dated May 19, 2020 (16 pages).
Partial ISR for PCT/GB2023/050001 (Mar. 31, 2023).
Patricio Rodrigues, E., Francisco de Oliveira, T., Yassunori Matuda, M., & Buiochi, F. (2019, September). Design and Construction of a 2-D Phased Array Ultrasonic Transducer for Coupling in Water. In Inter-Noise and Noise-Con Congress and Conference Proceedings (vol. 259, No. 4, pp. 5720-5731). Institute of Noise Control Engineering.
PCT Partial International Search Report for Application No. PCT/GB2018/053404 date of mailing Feb. 25, 2019, 13 pages.
Péter Tamás Kovács et al, "Tangible Holographic 3D Objects with Virtual Touch", Interactive Tabletops & Surfaces, ACM, 2 Penn Plaza, Suite 701 New York NY 10121-0701 USA, (Nov. 15, 2015), ISBN 978-1-4503-3899-8, pp. 319-324.
Phys.org, Touchable Hologram Becomes Reality, Aug. 6, 2009, by Lisa Zyga (2 pages).
Pompei, F.J. (2002), "Sound from Ultrasound: The Parametric Array as an Audible Sound Source", Massachusetts Institute of Technology (132 pages).
Rakkolainen et al., A Survey of Mid-Air Ultrasound Haptics and Its Applications (IEEE Transactions on Haptics), vol. 14, No. 1, 2021.
Rocchesso et al., Accessing and Selecting Menu Items by In-Air Touch, ACM CHItaly'19, Sep. 23-25, 2019, Padova, Italy (9 pages).
Rochelle Ackerley, Human C-Tactile Afferents Are Tuned to the Temperature of a Skin-Stroking Caress, J. Neurosci., Feb. 19, 2014, 34(8):2879-2883.
Ryoko Takahashi, Tactile Stimulation by Repetitive Lateral Movement of Midair Ultrasound Focus, Journal of Latex Class Files, vol. 14, No. 8, Aug. 2015.

(56) References Cited

OTHER PUBLICATIONS

Schmidt, Ralph, "Multiple Emitter Location and Signal Parameter Estimation" IEEE Transactions of Antenna and Propagation, vol. AP-34, No. 3, Mar. 1986, pp. 276-280.
Sean Gustafson et al., "Imaginary Phone", Proceedings of the 24th Annual ACM Symposium on User Interface Software and Techology: Oct. 16-19, 2011, Santa Barbara, CA, USA, ACM, New York, NY, Oct. 16, 2011, pp. 283-292, XP058006125, DOI: 10.1145/2047196.2047233, ISBN: 978-1-4503-0716-1.
Search report and Written Opinion of ISA for PCT/GB2015/050417 dated Jul. 8, 2016 (20 pages).
Search report and Written Opinion of ISA for PCT/GB2015/050421 dated Jul. 8, 2016 (15 pages).
Search report and Written Opinion of ISA for PCT/GB2017/050012 dated Jun. 8, 2017. (18 pages).
Search Report by EPO for EP 17748466 dated Jan. 13, 2021 (16 pages).
Search Report for GB1308274.8 dated Nov. 11, 2013. (2 pages).
Search Report for GB1415923.0 dated Mar. 11, 2015. (1 page).
Search Report for PCT/GB/2017/053729 dated Mar. 15, 2018 (16 pages).
Search Report for PCT/GB/2017/053880 dated Mar. 21, 2018. (13 pages).
Search report for PCT/GB2014/051319 dated Dec. 8, 2014 (4 pages).
Search report for PCT/GB2015/052507 dated Mar. 11, 2020 (19 pages).
Search report for PCT/GB2015/052578 dated Oct. 26, 2015 (12 pages).
Search report for PCT/GB2015/052916 dated Feb. 26, 2020 (18 pages).
Search Report for PCT/GB2017/052332 dated Oct. 10, 2017 (12 pages).
Search report for PCT/GB2018/051061 dated Sep. 26, 2018 (17 pages).
Search report for PCT/US2018/028966 dated Jul. 13, 2018 (43 pages).
Seo et al., "Improved numerical inverse kinematics for human pose estimation," Opt. Eng. 50(3 037001 (Mar. 1, 2011) https:// doi.org/10.1117/1.3549255 (Year: 2011).
Sergey Ioffe et al., Batch Normalization: Accelerating Deep Network Training by Reducing Internal Covariat Shift, Mar. 2, 2015, pp. 1-11.
Seungryul, Pushing the Envelope for RGB-based Dense 3D Hand Pose Estimation for RGB-based Desne 3D Hand Pose Estimation via Neural Rendering, arXiv:1904.04196v2 [cs.CV] Apr. 9, 2019 (5 pages).
Shakeri, G., Williamson, J. H. and Brewster, S. (2018) May the Force Be with You: Ultrasound Haptic Feedback for Mid-Air Gesture Interaction in Cars. In: 10th International ACM Conference on Automotive User Interfaces and Interactive Vehicular Applications (AutomotiveUI 2018) (11 pages).
Shanxin Yuan et al., BigHand2.2M Bechmark: Hand Pose Dataset and State of the Art Analysis, Dec. 9, 2017, pp. 1-9.
Shome Subhra Das, Detectioin of Self Intersection in Synthetic Hand Pose Generators, 2017 Fifteenth IAPR International Conference on Machine Vision Applications (MVA), Nagoya University, Nagoya, Japan, May 8-12, 2017, pp. 354-357.
ISR for PCT/GB2020/052546 (Feb. 23, 2021) (14 pages).
ISR for PCT/GB2020/053373 (Mar. 26, 2021) (16 pages).
Iwamoto et al. (2008), Non-contact Method for Producing Tactile Sensation Using Airborne Ultrasound, EuroHaptics, pp. 504-513.
Iwamoto et al., Airborne Ultrasound Tactile Display: Supplement, The University of Tokyo 2008 (2 pages).
Iwamoto T et al, "Two-dimensional Scanning Tactile Display using Ultrasound Radiation Pressure", Haptic Interfaces for Virtual Environment and Teleoperator Systems, 2006 14th Symposium on Alexandria, VA, USA Mar. 25-26, 2006, Piscataway, NJ, USA,IEEE, (Mar. 25, 2006), ISBN 978-1-4244-0226-7, pp. 57-61.

Jager et al., "Air-Coupled 40-KHZ Ultrasonic 2D-Phased Array Based on a 3D-Printed Waveguide Structure", 2017 IEEE, 4 pages.
Japanese Office Action (with English language translation) for Application No. 2017-514569, dated Mar. 31, 2019, 10 pages.
JonasChatel-Goldman, Touch increases autonomic coupling between romantic partners, Frontiers in Behavioral Neuroscience Mar. 2014, vol. 8, Article 95.
Jonathan Taylor et al., Articulated Distance Fields for Ultra-Fast Tracking of Hands Interacting, ACM Transactions on Graphics, vol. 36, No. 4, Article 244, Publication Date: Nov. 2017, pp. 1-12.
Jonathan Taylor et al., Efficient and Precise Interactive Hand Tracking Through Joint, Continuous Optimization of Pose and Correspondences, SIGGRAPH '16 Technical Paper, Jul. 24-28, 2016, Anaheim, CA, ISBN: 978-1-4503-4279-87/16/07, pp. 1-12.
Jonathan Tompson et al., Real-Time Continuous Pose Recovery of Human Hands Using Convolutional Networks, ACM Trans. Graph. 33, 5, Article 169, Aug. 2014, pp. 1-10.
JP Office Action for JP 2020-534355 (Dec. 6, 2022) (8 pages).
K. Jia, Dynamic properties of micro-particles in ultrasonic transportation using phase-controlled standing waves, J. Applied Physics 116, n. 16 (2014) (12 pages).
Kai Tsumoto, Presentation of Tactile Pleasantness Using Airborne Ultrasound, 2021 IEEE World Haptics Conference (WHC) Jul. 6-9, 2021. Montreal, Canada.
Kaiming He et al., Deep Residual Learning for Image Recognition, http://image-net.org/challenges/LSVRC/2015/ and http://mscoco.org/dataset/#detections-challenge2015, Dec. 10, 2015, pp. 1-12.
Kamakura, T. and Aoki, K. (2006) "A Highly Directional Audio System using a Parametric Array in Air" WESPAC IX 2006 (8 pages).
Keisuke Hasegawa, Electronically steerable ultrasound-driven long narrow air stream, Applied Physics Letters 111, 064104 (2017).
Keisuke Hasegawa, Midair Ultrasound Fragrance Rendering, IEEE Transactions on Visualization and Computer Graphics, vol. 24, No. 4, Apr. 2018 1477.
Keisuke Hasegawa,,Curved acceleration path of ultrasound-driven air flow, J. Appl. Phys. 125, 054902 (2019).
Ken Wada, Ring Buffer Basics (2013).
Kolb, et al., "Time-of-Flight Cameras in Computer Graphics," Computer Graphics forum, vol. 29 (2010), No. 1, pp. 141-159.
Konstantinos Bousmalis et al., Domain Separation Networks, 29th Conference on Neural Information Processing Systems (NIPS 2016), Barcelona, Spain. Aug. 22, 2016, pp. 1-15.
Krim, et al., "Two Decades of Array Signal Processing Research—The Parametric Approach", IEEE Signal Processing Magazine, Jul. 1996, pp. 67-94.
Lang, Robert, "3D Time-of-Flight Distance Measurement with Custom Solid-State Image Sensors in CMOS/CCD—Technology", A dissertation submitted to Department of EE and CS at Univ. of Siegen, dated Jun. 28, 2000, 223 pages.
Large et al., Feel the noise: Mid-air ultrasound haptics as a novel human-vehicle interaction paradigm, Applied Ergonomics (2019) (10 pages).
Li, Larry, "Time-of-Flight Camera—An Introduction," Texas Instruments, Technical White Paper, SLOA190B—Jan. 2014 Revised May 2014, 10 pages.
Light, E.D., Progress in Two Dimensional Arrays for Real Time Volumetric Imaging, 1998 (17 pages).
Line S Loken, Coding of pleasant touch by unmyelinated afferents in humans, Nature Neuroscience vol. 12 [ No. 5 [ May 2009 547.
M. Barmatz et al, "Acoustic radiation potential on a sphere in plane, cylindrical, and spherical standing wave fields", The Journal of the Acoustical Society of America, New York, NY, US, (Mar. 1, 1985), vol. 77, No. 3, pp. 928-945, XP055389249.
M. Toda, New Type of Matching Layer for Air-Coupled Ultrasonic Transducers, IEEE Transactions on Ultrasonics, Ferroelecthcs, and Frequency Control, vol. 49, No. 7, Jul. 2002 (8 pages).
Mahboob, "Artificial neural networks for learning inverse kinematics of humanoid robot arms." MS Thesis, 2015. (Year: 2015) 95 pages.
Mahdi Rad et al., Feature Mapping for Learning Fast and Accurate 3D Pose Inference from Synthetic Images, Mar. 26, 2018, pp. 1-14.

(56) References Cited

OTHER PUBLICATIONS

Marco A B Andrade et al, "Matrix method for acoustic levitation simulation", IEEE Transactions on Ultrasonics, Ferroelectrics and Frequency Control, IEEE, US, (Aug. 1, 2011), vol. 58, No. 8, ISSN 0885-3010, pp. 1674-1683.
Mariana von Mohr, The soothing function of touch: affective touch reduces feelings of social exclusion, Scientific Reports, 7: 13516, Oct. 18, 2017.
Marin, About LibHand, LibHand-A Hand Articulation Library, www.libhand.org/index.html, Mar. 26, 2020, pp. 1-2; www.libhand.org/download.html, 1 page; www.libhand.org/examples.html, pp. 1-2.
Markus Oberweger et al., DeepPrior++: Improving Fast and Accurate 3D Hand Pose Estimation, Aug. 28, 2017, pp. 1-10.
Markus Oberweger et al., Hands Deep in Deep Learning for Hand Pose Estimation, Dec. 2, 2016, pp. 1-10.
Marshall, M., Carter, T., Alexander, J., & Subramanian, S. (2012). Ultratangibles: creating movable tangible objects on interactive tables. In Proceedings of the 2012 ACM annual conference on Human Factors in Computing Systems, (pp. 2185-2188).
Marzo et al., Holographic acoustic elements for manipulation of levitated objects, Nature Communications DOI: 10.1038/ncomms9661 (2015) (7 pages).
Meijster, A., et al., "A General Algorithm for Computing Distance Transforms in Linear Time," Mathematical Morphology and its Applications to Image and Signal Processing, 2002, pp. 331-340.
Mingzhu Lu et al. (2006) Design and experiment of 256-element ultrasound phased array for noninvasive focused ultrasound surgery, Ultrasonics, vol. 44, Supplement, Dec. 22, 2006, pp. e325-e330.
Mitsuru Nakajima, Remotely Displaying Cooling Sensation via Ultrasound-Driven Air Flow, Haptics Symposium 2018, San Francisco, USA p. 340.
Mohamed Yacine Tsalamlal, Affective Communication through Air Jet Stimulation: Evidence from Event-Related Potentials, International Journal of Human-Computer Interaction 2018.
Mohamed Yacine Tsalamlal, Non-Intrusive Haptic Interfaces: State-of-the Art Survey, HAID 2013, LNCS 7989, pp. 1-9, 2013.
Mueller, GANerated Hands for Real-Time 3D Hand Tracking from Monocular RGB, Eye in-Painting with Exemplar Generative Adverserial Networks, pp. 49-59 (Jun. 1, 2018).
Nina Gaissert, Christian Wallraven, and Heinrich H. Bulthoff, "Visual and Haptic Perceptual Spaces Show High Similarity in Humans", published to Journal of Vision in 2010, available at http://www.journalofvision.org/content/10/11/2 and retrieved on Apr. 22, 2020 (Year: 2010), 20 pages.
Notice of Allowance dated Feb. 23, 2023 for U.S. Appl. No. 18/060,556 (pp. 1-10).
Notice of Allowance dated Apr. 20, 2021 for U.S. Appl. No. 16/563,608 (pp. 1-5).
Notice of Allowance dated Apr. 22, 2020 for U.S. Appl. No. 15/671,107 (pp. 1-5).
Notice of Allowance dated Dec. 19, 2018 for U.S. Appl. No. 15/665,629 (pp. 1-9).
"Flexible piezoelectric transducer for ultrasonic inspection of nonplanar components." Ultrasonics 48.5 (2008): 367-375.
Andre J. Duerinckx, Matched gaussian apodization of pulsed acoustic phased arrays, Ultrasonic Imaging, vol. 2, Issue 4, Oct. 1980, pp. 338-369.
Cappellari et al., "Identifying Electromyography Sensor Placement using Dense Neural Networks." In Data, pp. 130-141. 2018. (Year: 2018).
EPO Examination Report for EP19769198.3 (Jul. 11, 2023).
Examination Report for EP 17 826 539.3 (Aug. 2, 2023) (5 pages).
First Examination report for ndian Patent Application No. 202247024128 (Aug. 11, 2023) (6 pages).
ISR and WO for PCT/GB2023/050001 (May 24, 2023) (20 pages).
Montenegro et al., "Neural Network as an Alternative to the Jacobian for Iterative Solution to Inverse Kinematics," 2018 Latin American Robotic Symposium, 2018 Brazilian Symposium on Robotics (SBR) and 2018 Workshop on Robotics in Education (WRE) João Pessoa, Brazil, 2018, pp. 333-338 (Year: 2018).
Nuttall, A. (Feb. 1981). Some windows with very good sidelobe behavior. IEEE Transactions on Acoustics, Speech, and Signal Processing. 8 pages.
Office Action (Ex Parte Quayle Action) dated Jul. 20, 2023 for U.S. Appl. No. 16/843,281 (pp. 1-15).
Office Action (Ex Parte Quayle Action) dated Sep. 18, 2023 for U.S. Appl. No. 18/066,267 (pp. 1-6).
Office Action (Final Rejection) dated Jul. 25, 2023 for U.S. Appl. No. 17/454,823 (pp. 1-17).
Office Action (Final Rejection) dated Aug. 30, 2023 for U.S. Appl. No. 16/564,016 (pp. 1-15).
Office Action (Non-Final Rejection) dated Sep. 7, 2023 for U.S. Appl. No. 16/144,474 (pp. 1-16).
Office Action (Non-Final Rejection) dated Sep. 28, 2023 for U.S. Appl. No. 16/995,819 (pp. 1-8).
Office Action (Non-Final Rejection) dated Oct. 3, 2023 for U.S. Appl. No. 18/303,386 (pp. 1-18).
Office Action (Notice of Allowance and Fees Due (PTOL-85)) dated Jun. 16, 2023 for U.S. Appl. No. 17/354,636 (pp. 1-7).
Office Action (Notice of Allowance and Fees Due (PTOL-85)) dated Jul. 20, 2023 for U.S. Appl. No. 17/692,852 (pp. 1-8).
Office Action (Notice of Allowance and Fees Due (PTOL-85)) dated Aug. 2, 2023 for U.S. Appl. No. 16/843,281 (pp. 1-5).
Office Action (Notice of Allowance and Fees Due (PTOL-85)) dated Aug. 8, 2023 for U.S. Appl. No. 17/645,305 (pp. 1-8).
Office Action (Notice of Allowance and Fees Due (PTOL-85)) dated Sep. 11, 2023 for U.S. Appl. No. 18/065,603 (pp. 1-11).
Office Action (Notice of Allowance and Fees Due (PTOL-85)) dated Oct. 12, 2023 for U.S. Appl. No. 18/066,267 (pp. 1-5).
Office Action (Notice of Allowance and Fees Due (PTOL-85)) dated Oct. 18, 2023 for U.S. Appl. No. 17/477,536 (pp. 1-8).
Oyama et al., "Inverse kinematics learning for robotic arms with fewer degrees of freedom by modular neural network systems," 2005 IEEE/RSJ International Conference on Intelligent Robots and Systems, Edmonton, Alta., 2005, pp. 1791-1798, doi: 10.1109/IROS.2005.1545084. (Year: 2005).
Papoulis, A. (1977). Signal Analysis. The University of Michigan: McGraw-Hill, pp. 92-93.
Prabhu, K. M. (2013). Window Functions and Their Applications in Signal Processing. CRC Press., pp. 87-127.
Smart Interface: Piezo Components with Flexible Printed Circuit Boards, www.physikinstrumente.co.uk/en/products/piezo-ceramic-components-transducers-for-oems/smart-interface/ (accessed Sep. 11, 2023) 5 pages.
IL OA for IL 278402 (Nov. 29, 2023) 4 pages.
Inoue, A Pinchable Aerial Virtual Sphere by Acoustic Ultrasound Stationary Wave, IEEE (Year: 2014) 4 pages.
ISR and WO for PCT/GB2023/052122 (Oct. 18, 2023) 13 pages.
ISR and WO for PCT/GB2023/052612 (Mar. 7, 2024) 18 pages.
Ochiai, Cross-Field Aerial Haptics: Rendering Haptic Feedback in Air with Light and Acoustic Fields, CHI (Year: 2016) 10 pages.
Office Action (Non-Final Rejection) dated Jan. 19, 2024 for U.S. Appl. No. 18/305,354 (pp. 1-4).
Office Action (Non-Final Rejection) dated Feb. 1, 2024 for U.S. Appl. No. 17/835,411 (pp. 1-7).
Office Action (Non-Final Rejection) dated Mar. 28, 2024 for U.S. Appl. No. 18/359,951 (pp. 1-5).
Office Action (Notice of Allowance and Fees Due (PTOL-85)) dated Jan. 31, 2024 for U.S. Appl. No. 18/352,981 (pp. 1-6).
Schiefler, Generation and Analysis of Ultrasound Images Using Plane Wave and Sparse Arrays Techniques, Sensors (Year: 2018) 23 pages.
"Ryoko Takahashi, Keisuke Hasegawa, Hiroyuki Shinoda, Tactile Stimulation by Repetitive Lateral Movement of Midair Ultrasound Focus, Apr.-Jun. 2020, IEEE Transactions on Haptics, vol. 13, No. 2" (Year: 2020) 9 pages.
Bjørn Kolbrek, Modal Propagat Ion in Acous T IC Horns (Jun. 2012) (127 pages).
Chen, Xi. "Real-time Action Recognition for RGB-D and Motion Capture Data." (2014). (Year: 2014) 107 pages.

(56) References Cited

OTHER PUBLICATIONS

Kavan et al. (Dual Quaternions for Rigid Transformation Blending, 2006, ResearchGate, pp. 2-11) (Year: 2006).
Kussaba et al. (Hybrid kinematic control for rigid body pose stabilization using dual quaternions, Journal of the Franklin Institute 354 (2017) 2769-2787) (Year: 2017).
Notice of Allowance dated Sep. 16, 2024 for U.S. Appl. No. 18/305,354 (pp. 1-9).
Office Action (Final Rejection) dated Aug. 1, 2024 for U.S. Appl. No. 18/305,354 (pp. 1-10).
Office Action (Non-Final Rejection) dated Jun. 4, 2024 for U.S. Appl. No. 18/348,663 (pp. 1-18).
Office Action (Non-Final Rejection) dated Jun. 5, 2024 for U.S. Appl. No. 18/513,902 (pp. 1-16).
Office Action (Non-Final Rejection) dated Jun. 10, 2024 for U.S. Appl. No. 17/212,774 (pp. 1-15).
Office Action (Non-Final Rejection) dated Jun. 26, 2024 for U.S. Appl. No. 16/564,016 (pp. 1-15).
Office Action (Non-Final Rejection) dated Jul. 25, 2024 for U.S. Appl. No. 17/822,224 (pp. 1-16).
Office Action (Non-Final Rejection) dated Jul. 30, 2024 for U.S. Appl. No. 18/365,313 (pp. 1-7).
Office Action (Non-Final Rejection) dated Aug. 26, 2024 for U.S. Appl. No. 18/417,653 (pp. 1-13).
Office Action (Non-Final Rejection) dated Aug. 27, 2024 for U.S. Appl. No. 18/153,337 (pp. 1-6).
Office Action (Non-Final Rejection) dated Dec. 18, 2024 for U.S. Appl. No. 18/496,002 (pp. 1-5).
Office Action (Non-Final Rejection) dated Dec. 19, 2024 for U.S. Appl. No. 18/623,940 (pp. 1-7).
Office Action (Notice of Allowance and Fees Due (PTOL-85)) dated May 30, 2024 for U.S. Appl. No. 18/359,951 (pp. 1-7).
Office Action (Notice of Allowance and Fees Due (PTOL-85)) dated Jul. 22, 2024 for U.S. Appl. No. 17/835,411 (pp. 1-7).
Office Action (Notice of Allowance and Fees Due (PTOL-85)) dated Aug. 5, 2024 for U.S. Appl. No. 17/835,411 (pp. 1-2).
Office Action (Notice of Allowance and Fees Due (PTOL-85)) dated Aug. 28, 2024 for U.S. Appl. No. 18/365,313 (pp. 1-5).
Office Action (Notice of Allowance and Fees Due (PTOL-85)) dated Dec. 11, 2024 for U.S. Appl. No. 18/648,428 (pp. 1-8).
Polychronopoulos et al., Acoustic levitation with optimized reflective metamaterials, Scientific Reports (2020) 10:4254 (10 pages).
Supancic et al., "Depth-based hand pose estimation: data, methods, and challenges." In Proceedings of the IEEE international conference on computer vision, pp. 1868-1876. 2015. (Year: 2015).
Wang et al. (Translation and attitude synchronization for multiple rigid bodies using dual quaternions, Journal of the Franklin Institute 354 (2017) 3594-3616) (Year: 2017).
Wu et al. (Strapdown Inertial Navigation System Algorithms Based on Dual Quaternions,2009, IEEE, 2005, pp. 110-132) (Year: 2005).
Zhao et al., "Combining marker-based MOCAP and RGB-d camera for acquiring high-fidelity hand motion data." In Proceedings of the ACMSIGGRAPH/EurographicsSymposiumonComputer Animation. Eurographics Association, 33-42, 2012. (Year: 2012).

METHOD AND APPARATUS FOR PRODUCING AN ACOUSTIC FIELD

BACKGROUND

It is known to use a continuous distribution of sound energy, which will be referred to herein as an "acoustic field", for a range of applications, including haptic feedback.

It is known to control an acoustic field by defining one or more control points in a space within which the acoustic field may exist. Each control point is assigned an amplitude value equating to a desired amplitude of the acoustic field at the control point. Transducers are then controlled to create an acoustic field exhibiting the desired amplitude at each of the control points.

However, known systems for producing an acoustic field using control points suffer from limitations when a large number of control points are used.

SUMMARY OF INVENTION

According to a first aspect of the present invention there is provided a method of producing an acoustic field using an array of transducers having known relative positions and orientations, the method comprising:
  defining a plurality of control points which each have a known spatial relationship relative to the array of transducers;
  assigning an amplitude to each control point;
  computing a matrix containing elements which represent, for each of the control points, the effect that producing a modeled acoustic field having the assigned amplitude with a particular phase at the control point has on the consequential amplitude and phase of the modeled acoustic field at the other control points;
  determining eigenvectors of the matrix, each eigenvector representing a set of phases and relative amplitudes of the modeled acoustic field at the control points;
  selecting one of the sets and operating the transducer array to cause one or more of the transducers to output an acoustic wave each having an initial amplitude and phase such that the phases and amplitudes of the resultant acoustic field at the control points correspond to the phases and relative amplitudes of the selected set.

Thus, the first aspect of the invention inches formulating an eigenproblem which can be solved to find valid phases at the control points. The inventors have found that use of an eigenproblem in the embodiments of the invention results in a faster and more predictable solution time in comparison with known methods, which in turn means that a higher number of control points can be supported, and may enable real-time updating of the control points. A faster and more predictable solution time also means that an acoustic field of larger volume can be controlled in comparison to known methods.

A control point is a marker at a particular location. The distance between adjacent control points should be sufficient to enable the sound waves of the acoustic field to phase shift from one of the control points to match the next control point. In some embodiments the separation distance may be equal to the wavelength of the sound waves of the acoustic field.

In embodiments of the invention a transducer array comprises one or more transducers in any suitable configuration; for example, one or more two dimensional arrays arranged in parallel.

The modelled acoustic field which has the assigned amplitude and a particular phase at a control point may be modelled as being produced by a virtual transducer directly below the control point. In some embodiments the virtual transducer may be in the in the plane of the real transducer array. However, the skilled person will appreciate the acoustic field may be modelled as being produced by other arrangements of virtual transducers, that is one or more virtual transducers which may be positioned directly below the control point or may have a different spatial relationship to the control point may be used to produce the modelled acoustic field. The use of virtual transducers enables a lookup table to be pre-computed. Preferably, the virtual transducers match the transducers of the transducer array.

The method may include the step of calculating eigenvalues of the matrix. The eigenvalues represent scaling factors, some of which will be relatively high and some of which will be relatively low, in relation to each other. The method may comprise selecting a set of phases and relative amplitudes with a relatively high corresponding eigenvalue as the selected set. Preferably, the method may comprise selecting the set of phases and relative amplitudes with the highest corresponding eigenvalue as the selected set.

The eigenvalues define how the corresponding eigenvectors scale when they are transformed by the matrix. That is, the eigenvalues represent how much the relative amplitudes of the acoustic field at the control points will scale up once the indirect contributions to the amplitude at each control point caused by producing an assigned amplitude at the other control points is taken into account. Therefore, finding a large eigenvalue indicates a corresponding set of relative amplitudes and phases that make use of a large amount of constructive interference. Choosing a set of relative amplitudes and phases with a corresponding eigenvalue which is relatively high, taking into account the relative values of all the eigenvalues of the matrix, therefore has an advantage over choosing a relatively low eigenvalue, as it makes more efficient use of the power output by the transducers.

The method may include computing the effect of producing the assigned amplitude at one of the control points on the amplitude and phases at each of the other control points using a look-up function which defines how the amplitude and phase of the acoustic waves varies spatially due to attenuation and propagation. The look-up function may take into account one or both of two sources of amplitude and phase variation. Firstly, attenuation of the amplitude of acoustic waves output by a transducer, which increases with distance from the transducer, and secondly, the changes in phase that occur as the acoustic waves propagate through space.

If such a look-up function is used, the spatial variation of the phase of the sound waves due to attenuation and propagation only needs to be computed once for a particular transducer array, which decreases the time needed to model the acoustic field and the time needed to calculate the initial amplitude and phases of the transducers that will produce the phases and amplitudes of the resultant acoustic field.

The method may include a regularisation step in which errors are introduced into the initial amplitude and phase output by the transducers.

The advantage of including a regularisation step is that this can improve the power output efficiency of the array by increasing the average amplitude of the transducers so that more of them are on at a higher amplitude. For example, to avoid a situation where one transducer is on at 100% and all of the others are on at 0.1%, the regularisation step introduces some errors in return for the average amplitude of the transducers being raised to, say, 80%.

The regularisation technique may be a weighted Tikhonov regularisation. The advantage of using a weighted Tikhonov regularisation is that it has an easily specified matrix augmentation.

The power output by the transducer array may be scaled such that the transducer outputting the highest of the initial amplitudes operates at substantially full power. Scaling the power output in this way has an advantage in that it results in the power output of the transducer array being as high as possible for a given set of initial amplitudes, whilst maintaining the levels of the initial amplitudes, relative to each other.

The transducers may be ultrasound transducers.

Using ultrasound transducers gives rise to an advantage in the areas of, for example, haptic feedback, where the transducer array may be operated such that a user feels an acoustic radiation force produced by the acoustic field, or in manufacturing, for example for drying glue on products on a production line.

The acoustic waves may be modulated at a frequency between 0 Hz and half of the carrier frequency; in some embodiments the carrier frequency is 40 kHz. In some embodiments the acoustic waves may be modulated at a frequency between 0.1 Hz to 500 Hz, and in some cases between 200 Hz and 300 Hz.

Modulating the acoustic waves at a frequency between 0.1 Hz to 500 Hz gives rise to an advantage of increasing the suitability of the method for use in haptic feedback applications, since tactile receptors in skin are most sensitive to changes in skin deformation at these frequencies.

The positions of the control points may be chosen to define parts of a virtual three-dimensional shape which occupies a volume in the acoustic field. For example, the control points may lie on the edges of the shape or adjacent to the edges of the shape or within the volume of the shape. The control points may define the whole of the shape, or more preferably a part of the shape. For example the control points may define a shape to be felt by a user as part of a haptic feedback system of which only the part of the shape with which the user is interacting may need to be defined, or the shape may be the shape of a product having points of interest on which an acoustic radiation force may be focussed for manufacturing applications such as drying glue.

The control points may be divided into a first group of control points at which the acoustic field has a relatively high amplitude and a second group of control points at which the acoustic field has a relatively low amplitude in comparison to the high amplitude. The edges of the virtual shape may be defined by the first group of control points. The control points in the second group may be adjacent to the first group of control points, such that a gradient in amplitude of the acoustic field is produced at the edge of the virtual shape. In some embodiments a control point of the first group may be spaced from an adjacent control point from the second group by at least half a wavelength of the sound waves of the acoustic field.

Providing a group of control points at which the acoustic field has a relatively high amplitude and a group of control points at which the acoustic field has a relatively low amplitude to provide a gradient in amplitude of the acoustic field at the edge of a virtual shape provides an advantage in haptic feedback applications since it produces a more detectable difference in amplitude of the acoustic field, rendering the edge of the virtual shape more easily detectable by a user. Also, in the case of haptic feedback, the relatively low amplitude control points can ensure that the parts of a user's hand that are not in contact with the shape cannot feel residual ultrasound surrounding the shape, in the absence of the low amplitude control points, the ultrasound at those points is not controlled and so there may be some constructive areas that the hand can feel.

At least some of the control points may be positioned at points where an object intersects with the virtual shape. At least some of the control points may be positioned adjacent to the points of intersection.

Positioning the control points at points in the region of where an object, for example a user's hand, intersects the virtual shape provides the advantage that the acoustic field only needs to be controlled at points on the virtual shape with which the object is interacting, which enables higher amplitudes to be produced at those control points. The points where the object intersects with the virtual shape may be monitored in real time by an object tracker, and control points may be positioned at different points in the acoustic field in response to the object position.

In some embodiments a low amplitude control point may be supported by high amplitude control points to define a pocket that can hold an object at the low amplitude control point.

The number of control points may be at least 10 and preferably at least 50. The upper limit on the number of control points may be governed by how large matrices linear algebra algorithms can process.

A higher number of control points enables the produced acoustic field to have more points at which the amplitude can be controlled. This feature enables, for example, more complicated 3-dimensional or 2-dimensional virtual shapes to be defined, or where only part of a virtual shape is being defined, more detail may be represented on that part of the shape.

The method may comprise a method for producing haptic feedback, a method for levitation of small, objects, a method for manufacturing, or a method for non-destructive testing.

According to a second aspect of the invention, there is provided an apparatus for producing an acoustic field, the apparatus comprising an array of transducers having known relative positions and orientations, and a data processor, the data processor configured to:

compute a matrix containing elements which represent for each of a plurality of control points, which each have a known spatial relationship relative to the array of transducers and each have an amplitude assigned to them, the effect that producing a modeled acoustic field having the assigned amplitude with a particular phase at the control point has on the consequential amplitude and phase of the modeled acoustic field at the other control points;

determine eigenvectors of the matrix, each eigenvector representing a set of phases and relative amplitudes of the modeled acoustic field at the control points, such that one of the sets may be selected and the transducer array may be operated to cause one or more of the transducers to output an acoustic wave each having an initial amplitude and phase such that the phases and amplitudes of the resultant acoustic field at the control points correspond to the phases and relative amplitudes of the selected control set.

Thus, the apparatus according to the second aspect is configured to formulate an eigenproblem which can be solved to find valid phases at the control points. The inventors have found that use of an eigenproblem in the embodiments of the invention results in a faster and more predictable solution time in comparison with known apparatuses, which in turn means that a higher number of control points can be supported, and may enable real-time updating of a large number of control points. A less powerful data processor may be required than if the data processor was configured to perform, say, an iterative method to find valid phases at the control points. A faster and more predictable solution time also means that an acoustic field of larger volume can be controlled in comparison to known methods.

The apparatus may be arranged to determine eigenvalues of the matrix, the eigenvalues representing scaling factors, some of which will be relatively high and some of which will be relatively low, wherein a set of phases and relative amplitudes with a relatively high corresponding eigenvalue is selected as the selected set.

The eigenvalues define how the corresponding eigenvectors scale when they are transformed by the matrix. That is, the eigenvalues represent how much the relative amplitudes of the acoustic field at the control points will scale up once the indirect contributions to the amplitude at each control point caused by producing an assigned amplitude at the other control points is taken into account. Therefore, finding a large eigenvalue indicates a corresponding set of relative amplitudes and phases that make use of a large amount of constructive interference. An apparatus arranged to choose a set of relative amplitudes and phases with a corresponding eigenvalue which is relatively high, taking into account the relative values of all the eigenvalues of the matrix, therefore has an advantage over an apparatus that may choose a relatively low eigenvalue, as it makes more efficient use of the power output by the transducers.

The data processor may be arranged to perform a regularisation step in which errors are introduced into the initial amplitude and phase output by the transducers.

The advantage of performing a regularisation step is that this can improve the power output efficiency of the array by increasing the average amplitude of the transducers so that more of them are on at a higher amplitude. For example, to avoid a situation where one transducer is on at 100% and all of the others are on at 0.1%, the regularisation step introduces some errors in return for the average amplitude of the transducers being raised to, say, 80%.

The regularisation step may be a weighted Tikhonov regularisation. The advantage of using a weighted Tikhonov regularisation is that it has an easily specified matrix augmentation.

The apparatus may be arranged to modulate the acoustic waves at a frequency between 0 Hz and half of the carrier frequency; in some embodiments the carrier frequency is 40 kHz. In some embodiments the acoustic waves may be modulated at a frequency between 0.1 Hz to 500 Hz, and in some cases between 200 Hz and 300 Hz.

Modulating the acoustic waves at a frequency between 0.1 Hz to 500 Hz gives rise to an advantage of increasing the suitability of the apparatus for use in haptic feedback applications, since tactile receptors in skin are most sensitive to changes in skin deformation at these frequencies.

The apparatus may comprise an object tracker and may be configured to define control points based on where the object intersects a modelled shape.

The use of an object tracker, such as a hand tracker, provides an advantage of enabling positions of control points to be updated in real time in response to the position of, say, a user's hand which may be moving.

According to a third aspect of the invention, there is provided a data processor configured to perform the method of the first aspect of the invention.

The data processor according to the third aspect may result in a faster and more predictable solution time, which in turn means that a higher number of control points can be supported, and may enable real-time updating of the control points by the data processor. In addition a less powerful data processor may be needed to perform the method of the first aspect of the invention than if the data processor was configured to perform an iterative method. A faster and more predictable solution time also means that an acoustic field of larger volume can be controlled in comparison to known methods

BRIEF DESCRIPTION OF THE DRAWING

Embodiments of the invention will now be described, by way of example only, with reference to the accompanying drawings, of which.

DESCRIPTION OF EMBODIMENTS

Figure 1:
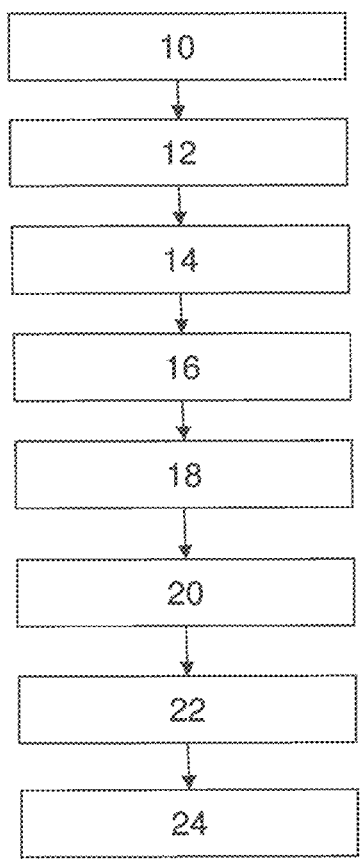
FIG. 1 is a flow chart schematically representing a method according to an embodiment of the invention.

FIG. 1 shows a flow chart schematically representing a method of producing an acoustic field according to a first embodiment of the invention.

The method begins at step 10, in which in which a plurality of control points are defined. A control point is a point positioned in a space through which the acoustic field may propagate, at which the amplitude or phase of the acoustic field is to be controlled A control point is a marker at a particular location. The distance between adjacent control points should be sufficient to enable the sound waves of the acoustic field to phase shift from one of the control points to match the next control point. In some embodiments the separation distance may be equal to the wavelength of the sound waves of the acoustic field, for example a separation of 8.5 mm for a 40 kHz carrier wave. In some embodiments, the separation distance may be equal to half the wavelength of the sound waves of the acoustic field. In some embodiments the separation may be greater than the wavelength of the sound waves of the acoustic field. The skilled person will appreciate that other suitable separation distances could be used.

An array of transducers is arranged to produce the acoustic field. In embodiments of the invention a transducer array comprises one or more transducers in any suitable configuration; for example, one or more two dimensional arrays arranged in parallel.

The positions of the control points relative to the array of transducers is determined. The use of control points to control an acoustic field is known from a paper entitled "The possibility of generating focal regions of complex configurations in application to the problems of stimulation of human receptor structures by focused ultrasound", L. R. Gavrilov, 2008, Acoustical Physics Volume 54, Issue 2, pp 269-278, Print ISSN 1063-7710.

In the first embodiment, the acoustic field is produced in air. However, in some embodiments the acoustic field may be produced in another medium through which sound waves can pass, such as water.

At step 12 amplitudes are assigned to the control points. The assigned amplitudes represent target amplitudes of the acoustic field at the control points, which form a basis for modelling the acoustic field. The control points are assigned by a user; however, in other embodiments, the control points may be assigned by an automated process.

At step 14, an acoustic field is modelled for each control point. According to the first embodiment, modelling the acoustic field at a control point comprises modelling the acoustic field produced by a virtual transducer directly below the control point in the plane of the real transducer array, the initial amplitude and phase of the virtual transducer hexing modelled such that the modelled acoustic field has the assigned amplitude at the control point. However, in some embodiments, alternative ways of modelling the acoustic field may be used, for example, different arrangements of virtual transducers may be used, that is one or more virtual transducers may be positioned directly below the control point or may have a different spatial relationship to the control point may be used to produce the modelled acoustic field. In the first embodiment, step 14 comprises modelling the acoustic field separately for each control point.

At step 16, a matrix is computed which contains elements which represent, for each of the control points, the effect that producing the modeled acoustic field of step 14 having the assigned amplitude of step 12 with a particular phase at the control point has on the consequential amplitude and phase of the modeled acoustic field at the other control points. In the first embodiment, the matrix computed at step 16 is an N×N matrix where N equals the number of control points although other suitable forms of matrix will be apparent.

At step 18, eigenvectors of the matrix are determined. In the first embodiment step 18 comprises determining right eigenvectors of the matrix, each eigenvector representing a set of phases and relative amplitudes of the modeled acoustic field at the control points.

At step 20, a set of relative phases and amplitudes is selected by selecting one of the eigenvectors determined in step 18.

At step 22, initial phases and amplitudes to be output by the individual transducers of the array of transducers are calculated. The initial phases and amplitudes are calculated such that they produce a resultant acoustic field with phases and amplitudes that correspond to the phases and relative amplitudes of the selected set. In embodiments of the invention the term "correspond" may be used to mean that the phases and amplitudes of the resultant acoustic field at the control points will be substantially equal to the phases and relative amplitudes of the selected set, taking into account any errors that may be introduced as part of a regularisation step. Thus, the algorithm according to embodiments of the invention may compute the phase delay and amplitude for the transducers in the array that will create an acoustic field that best matches the assigned amplitudes of the control points.

At step 24, the transducers of the transducer array are operated such that the transducer array outputs acoustic waves having the initial amplitudes and phases which were calculated in step 22.

In some embodiments, the transducers may be operated to continue to output one or more acoustic waves. In some embodiments, the control points may be re-defined and the method may repeat with a different set of control points.

In some embodiments, the method may include the step of calculating eigenvalues of the matrix. The eigenvalues represent scaling factors, some of which will be relatively high and some of which will be relatively low, in relation to each other. In some embodiments, the method may comprise selecting a set of phases and relative amplitudes with a relatively high corresponding eigenvalue as the selected set. In some embodiments, the method may comprise selecting the set of phases and relative amplitudes with the highest corresponding eigenvalue as the selected set.

The eigenvalues define how the corresponding eigenvectors scale when they are transformed by the matrix. That is, the eigenvalues represent how much the relative amplitudes of the acoustic field at the control paints will scale up once the indirect contributions to the amplitude at each control point caused by producing an assigned amplitude at the other control points is taken into account. Therefore, finding a large eigenvalue indicates a corresponding set of relative amplitudes and phases that make use of a large amount of constructive interference.

Choosing a set of relative amplitudes and phases with a corresponding eigenvalue which is relatively high, taking into account the relative values of all the eigenvalues of the matrix, has an advantage over choosing a relatively low eigenvalue, as it makes more efficient use of the power output by the transducers.

In some embodiments, the method may include computing the effect of producing the assigned amplitude at one of the control points on the amplitude and phases at each of the other control points using a look-up function which defines how the amplitude and phase of the acoustic waves varies spatially due to attenuation and propagation.

In some embodiments in which a look-up function is used, the spatial variation of the phase of the sound waves due to attenuation and propagation is computed once for a particular transducer array, which decreases the time needed to model the acoustic field and the time needed to calculate the initial amplitude and phases of the transducers that will produce the phases and amplitudes of the resultant acoustic field.

In some embodiments, the method may include a regularisation step in which errors are introduced into the initial amplitude and phase output by the transducers.

The advantage of including a regularisation step is that this can improve the power output efficiency of the array by increasing the average amplitude of the transducers so that more of them are on at a higher amplitude. For example, to avoid a situation where one transducer is on at 100% and all of the others are on at 0.1%, the regularisation step introduces some errors in return for the average amplitude of the transducers being raised to, say, 80%.

In some embodiments, the regularisation technique may be a weighted Tikhonov regularisation. The advantage of using a weighted Tikhonov regularisation is that it has an easily specified matrix augmentation.

In some embodiments, the power output by the transducer array may be scaled such that the transducer outputting the highest of the initial amplitudes operates at substantially full power. Scaling the power output in this way has an advantage in that it results in the power output of the transducer array being as high as possible for a given set of initial amplitudes, whilst maintaining the levels of the initial amplitudes, relative to each other.

In some embodiments, the transducers may be ultrasound transducers.

Using ultrasound transducers gives rise to an advantage in the areas of, for example, haptic feedback, where the transducer array may be operated such that a user feels an acoustic radiation force produced by the acoustic field, or in manufacturing, for example for drying glue on products on a production line.

In some embodiments, the acoustic waves may be modulated at a frequency between 0 Hz and half of the carrier frequency; in some embodiments the carrier frequency is 40 kHz. In some embodiments the acoustic waves may be modulated at a frequency between 0.1 Hz to 500 Hz, and in some cases between 200 Hz and 300 Hz.

Modulating the acoustic waves at a frequency between 0.1 Hz to 500 Hz gives rise to an advantage of increasing the suitability of the method for use in haptic feedback applications, since tactile receptors in skin are most sensitive to changes in skin deformation at these frequencies.

In some embodiments, the positions of the control points may be chosen to define parts of a virtual three-dimensional shape which occupies a volume in the acoustic field. In some embodiments, the control points may be on the edges of the shape or adjacent to the edges of the shape. In some embodiments, the control points may lie within the volume of the shape. In some embodiments, the control points may define the whole of the shape. In some embodiments the control points may define part of the shape. In some embodiments, the control points may define a shape to be felt by a user as part of a haptic feedback system of which only the part of the shape with which the user is interacting may need to be defined. In some embodiments, the shape may be the shape of a product having points of interest on which an acoustic radiation force may be focussed for manufacturing applications such as drying glue.

In some embodiments, the control points may be divided into a first group of control points at which the acoustic field has a relatively high amplitude and a second group of control points at which the acoustic field has a relatively tow amplitude in comparison to the high amplitude. The control points amplitude may be between the maximum and minimum. For example, some control points could be at half amplitude. Some applications may have a wide distribution of amplitudes throughout the control points; for example, in order to vary the intensity of haptic feedback across a region.

In some embodiments, the edges of the virtual shape may defined by the first group of control points. The control points in the second group may each be arranged so as to be adjacent to a control point of the first group, such that a gradient in amplitude of the acoustic field is produced at the edge of the virtual shape.

Providing a group of control points at which the acoustic field has a relatively high amplitude and a group of control points at which the acoustic field has a relatively low amplitude to provide a gradient in amplitude of the acoustic field at the edge of a virtual shape provides an advantage in haptic feedback applications since it produces a more detectable difference in amplitude of the acoustic field, rendering the edge of the virtual shape more easily detectable by a user.

At least some of the control points may be positioned at points where an object intersects with the virtual shape. At least some of the control points may be positioned adjacent to the points of intersection.

Positioning control points in the region of points where an object such as a user's hand intersects the virtual shape provides the advantage that the acoustic field only needs to be controlled at points on the virtual shape with which the object is interacting, which enables higher amplitudes to be produced at those control points. The points where the object intersects with the virtual shape may be monitored in real time by an object tracker, and control points may be positioned at different points in the acoustic field in response to the object position.

In some embodiments, the number of control points may be at least 10 and preferably at least 50.

A higher number of control points enables the produced acoustic field to have more points at which the amplitude can be controlled. This feature enables, for example, larger or more complicated 3-dimensional or 2-dimensional virtual shapes to be defined, or where only part of a virtual shape is being defined, more detail may be represented on that part of the shape.

Figure 2:
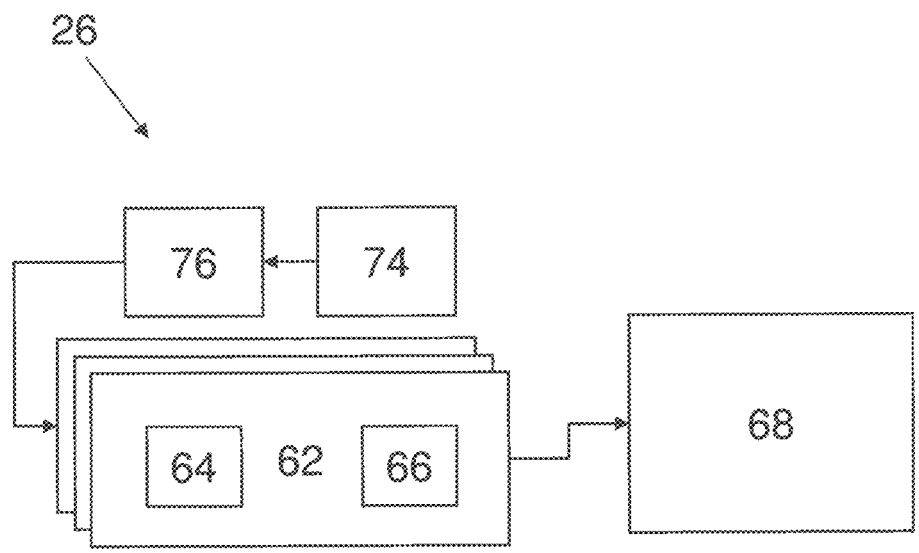
FIG. 2 is a schematic representation showing an apparatus according to an embodiment of the invention.

FIG. 2 shows an apparatus 26 according to an embodiment of the invention for producing an acoustic field.

The apparatus 26 comprises an array of transducers 68 having known relative positions and orientations. The array 68 may be a 2D planar array, may be a regular array or any other suitable set of transducers having any suitable arrangement, and may comprise any suitable number of transducers, such as a 16×16 array. It is preferred that the array comprises at least four transducers. Any suitable type of acoustic transducers may be used; for example, muRata MA40S4S ultrasound transducers. muRata MA40S4S transducers provide an advantage in that they produce a relatively large amount of sound pressure (20 Pascals at a distance of 30 cm) and have a relatively wide angle of directivity (60 degrees).

In the embodiment shown in FIG. 2, the acoustic waves output by the transducers have a frequency of 40 kHz. The advantage of using acoustic waves of this frequency is that acoustic waves of this frequency maintain 90% of their energy at a distance of 400 mm from a radiation surface in air. A further advantage is that piezoelectric transducers that emit acoustic waves which have a frequency of 40 kHz are commercially available due to their use in car parking sensors. However, acoustic waves of any suitable frequency may be used. In the embodiment shown in FIG. 2, all of the acoustic waves used to produce the acoustic field are of the same frequency. However, in some embodiments the acoustic field may be produced using acoustic waves of two or more different frequencies.

The transducers 68 are driven by driver boards 62, which each include processors 64 and amplifiers 66. Any suitable type of processors may be used; for example XMOS L1-128 processors running at 400 MHz. The data processors 64 have synchronised clocks and produce a signal to be sent to each transducer, that will cause the transducers to output acoustic waves having the initial amplitudes and phases required to produce the acoustic field. In the embodiment shown in FIG. 2, the data processors output one square wave for each transducer. The amplifiers 66 amplify the signals output by the data processor to a level suitable for driving the transducers. In the embodiment shown in FIG. 2, the square wave signals are amplified from 5V peak to peak to 15V by the amplifiers 66.

In the embodiment shown in FIG. 2, the apparatus further comprises a PC 74, which includes a data processor. The data processor is configured to compute a matrix containing elements which represent for each of a plurality of control points, which each have a known spatial relationship relative to the array of transducers and each have an amplitude assigned to them, the effect that producing a modeled acoustic field having the assigned amplitude with a particular phase at the control point has on the consequential amplitude and phase of the modeled acoustic field at the other control points. The data processor is also configured to determine eigenvectors of the matrix, each eigenvector representing a set of phases and relative amplitudes of the modeled acoustic field at the control paints. In some embodiments the data processor may comprise one or more discrete data processors. Any suitable type of data processors may be used with embodiments of the invention, such as microcontrollers or ASICs.

In some embodiments, the control points may be defined by a user. In some embodiments the control points may be defined automatically, in response to data collected by another piece of apparatus such as a hand tracker. In some embodiments, the amplitudes of the control points may be assigned by a user. In some embodiments, the amplitudes of the control points may be assigned by an automated process.

In some embodiments, the data processor configured to compute the matrix may be part of the PC 74. In some embodiments, the data processor configured to compute the matrix may be a stand alone unit which may be further configured to select one of the sets of phases and relative amplitudes and operate the transducer array to cause one or more of the transducers to output an acoustic wave each having an initial amplitude and phase such that the phases and amplitudes of the resultant acoustic field at the control points correspond to the phases and relative amplitudes of the selected set.

In the embodiment shown in FIG. 2, data processed by the PC 74 is sent to the driver boards 62 via an Ethernet controller 76. The Ethernet controller comprising an Ethernet interface and a processor. The Ethernet controller 76 sorts the received data and forwards it to the processors 64 of the driver boards 62. However, other protocols such as Thunderbolt, USB, Firewire etc. may be used.

In some embodiments, the data processor may be arranged to determine eigenvalues of the matrix, the eigenvalues representing scaling factors, some of which will be relatively high and some of which will be relatively low, wherein a set of phases and relative amplitudes with a relatively high corresponding eigenvalue is selected as the selected set. In some embodiments, the apparatus may be arranged to select the eigenvector with the highest corresponding eigenvalue.

The eigenvalues define how the corresponding eigenvectors scale when they are transformed by the matrix. That is, the eigenvalues represent how much the relative amplitudes of the acoustic field at the control points will scale up once the indirect contributions to the amplitude at each control point caused by producing an assigned amplitude at the other control points is taken into account. Therefore, finding a large eigenvalue indicates a corresponding set of relative amplitudes and phases that make use of a large amount of constructive interference. An apparatus arranged to choose a set of relative amplitudes and phases with a corresponding eigenvalue which is relatively high, taking into account the relative values of all the eigenvalues of the matrix, therefore has an advantage over an apparatus that may choose a relatively low eigenvalue, as it makes more efficient use of the power output by the transducers.

Any suitable method of calculating the eigenvectors and eigenvalues of the matrix may be used; for example the CGEEV routine of the MAGMA GPU linear algebra library may be used. Any suitable method of calculating the initial amplitudes and phases that will produce the acoustic field may be used; for example the CGELS LAPACK routine of the MAGMA CPU linear algebra library may be used.

In some embodiments, the apparatus may be arranged to perform a regularisation step in which errors are introduced into the initial amplitude and phase output by the transducers.

The advantage of performing a regularisation step is that this can improve the power output efficiency of the array by increasing the average amplitude of the transducers so that more of them are on at a higher amplitude. For example, to avoid a situation where one transducer is on at 100% and all of the others are on at 0.1%, the regularisation step introduces some errors in return for the average amplitude of the transducers being raised to, say, 80%. In the embodiment shown in FIG. 2 the regularisation step is performed by the PC 74.

In some embodiments, the regularisation step may be a weighted Tikhonov regularisation. The advantage of using a weighted Tikhonov regularisation is that it has an easily specified matrix augmentation.

In some embodiments, the apparatus may be arranged to modulate the acoustic waves at a frequency between 0 Hz and half of the carrier frequency; in some embodiments the carrier frequency is 40 kHz. In some embodiments the acoustic waves may be modulated at a frequency between 0.1 Hz to 500 Hz, and in some cases between 200 Hz and 300 Hz.

Modulating the acoustic waves at a frequency between 0.1 Hz to 500 Hz gives rise to an advantage of increasing the suitability of the apparatus for use in haptic feedback applications, since tactile receptors in skin are most sensitive to changes in skin deformation at these frequencies.

The apparatus may comprise an object tracker and may be configured to define control points based on where the object intersects a modelled shape.

Figure 3:
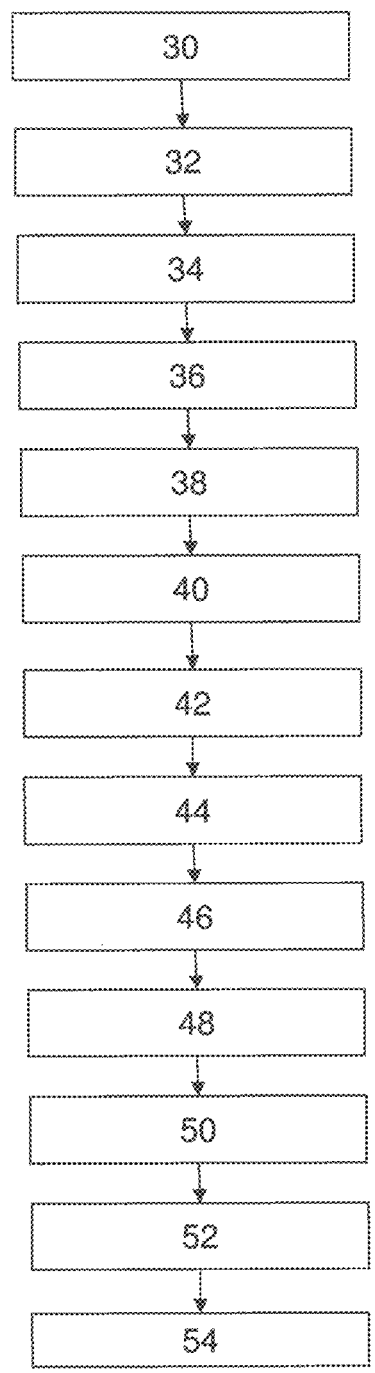
FIG. 3 is a flow chart schematically representing a method according to a further embodiment of the invention.

FIG. 3 shows a flow chart which schematically represents the method according to an embodiment of the invention, in which the method is for a haptic feedback application.

At step 30 a look-up function is calculated, which defines how the amplitude and phase of the acoustic waves vary spatially due to attenuation and propagation. The look-up function of the embodiment of the invention shown in FIG. 3 takes into account two sources of amplitude and phase variation. Firstly, attenuation of the amplitude of acoustic waves output by a transducer, which increases with distance from the transducer, and secondly, the changes in phase that occur as the acoustic waves propagate through space.

At step 32, a three-dimensional virtual shape is defined in the volume to be occupied by the acoustic field. The three-dimensional shape may be defined by a user or defined by an automated process.

At step 34, the position of a hand within the volume to be occupied by the acoustic field is tracked. The hand tracking may be performed by a known hand tracker such as a Leap Motion (RTM) Controller produced by Leap Motion Inc, which has a range of 1.00 cm and a field of view of 140 degrees. In the embodiment shown in FIG. 3, tracking data is captured at 60 fps, although in some embodiments, tracking data may be captured at other speeds. Step 34 additionally comprises determining the positions of any points at which the hand is intersecting the virtual shape.

At step 36, control points are defined. In the embodiment shown in FIG. 3 the positions of the control points are chosen such that they define at least one part of the three-dimensional virtual shape; for example, the control points may lie or on or adjacent to the edges of the virtual three-dimensional shape. The control points are defined at parts of the virtual three-dimensional shape which are intersected by a hand.

In some embodiments, step 32 may be omitted and the control points may be defined in response to measurements of a user's hand. In embodiments in which step 32 is omitted, the control points may be positioned on the fingertips or palm of a users hand, for example, in applications such as projecting Braille onto a user's hand In the embodiment shown in FIG. 3, the control points are divided into two groups. The first group of control points are positioned on an edge of the virtual three dimensional shape and the second group of control points are positioned adjacent to the control points of the first group, outside of the volume occupied by the three dimensional shape; for example, by creating a bounding box around the hand and then slightly enlarging it to include nearby control points. In the embodiment shown in FIG. 3, the three-dimensional shape is defined by control points positioned at an edge of the shape, however in some embodiments, the three dimensional shape may be defined by additionally or alternatively having control points positioned within the volume of the shape.

At step 38 amplitudes are assigned to the control points. The first group of control points are assigned relatively high amplitudes and the second group of control points are assigned relatively low amplitudes, in order to create a gradient at the edge of the three-dimensional virtual shape.

At step 40 an acoustic field is modelled for each control point. Modelling the acoustic field at a control point comprises modelling the acoustic field produced by a virtual transducer directly below the control point in the plane of the real transducer array, the initial amplitude and phase of the virtual transducer being modelled such that the modelled acoustic field has the assigned amplitude at the control point. This calculation is done using the look-up function that was calculated in step 30. Step 40 comprises modelling the acoustic field in this way separately for each control point.

At step 42, a matrix is computed containing elements which represent, for each of the control points, the effect that producing the modeled acoustic field of step 40 having the assigned amplitude of step 38 with a particular phase at the control point has on the consequential amplitude and phase of the modeled acoustic field at the other control points. In the embodiment shown in FIG. 3, the matrix computed at step 42 is an N×N matrix where N equals the number of control points, although other suitable forms of matrix will be apparent.

At step 44, eigenvectors of the matrix are determined. In the embodiment shown in FIG. 3 step 44 comprises determining right eigenvectors of the matrix, each eigenvector representing a set of phases and relative amplitudes of the modeled acoustic field at the control points.

The embodiment shown in FIG. 3 additionally includes step 46, which comprises determining eigenvalues of the matrix. In some embodiments, determining eigenvectors and eigenvalues of the matrix may comprise a single step in the method.

At step 48 a set of relative phases and amplitudes is selected. In the embodiment shown in FIG. 3 the set of relative phases and amplitudes is selected by selecting an eigenvector with a corresponding eigenvalue which is relatively high, taking into account the relative values of all the eigenvalues of the matrix. Preferably, the eigenvector with the highest corresponding eigenvalue is selected.

At step 50, the initial phases and amplitudes to be output by the individual transducers of the array of transducers are calculated, such that the phases and amplitudes of the resultant acoustic field at the control points correspond to the phases and relative amplitudes of the selected set. In the embodiment shown in FIG. 3, the calculation of step 50 is performed using the look-up table previously calculated in step 30. In the embodiment shown in FIG. 3, the array of transducers comprises 64 transducers that are positioned in a single plane. However in alternative embodiments, different numbers and arrangements of transducers could be used to form the transducer array.

At step 52, a regularisation step is performed in order to ensure that the acoustic waves output by the transducers do not exceed the power limitations of the transducers. The regularisation step is a weighted Tikhonov regularisation in which errors are introduced into the initial amplitude and phase output by the transducers, such that the transducers do not exceed the power limitations of the array, and the total power availability of the array is used more efficiently than if the method was performed without a regularisation step.

At step 52, gain is also introduced to normalise the power output of the array, causing the transducer with the highest calculated initial amplitude to operate at substantially full power, and scaling up the power output by the other transducers of the array such that the relative values of the amplitudes are not changed by introducing gain. The values of the relative amplitudes may be slightly changed during step 52 due to the errors introduced during the regularisation step. Therefore the initial amplitudes and phases that are used in step 54 are the adjusted values of the initial amplitudes and phases of step 50, taking into account any adjustment to the values of the initial amplitudes and phases provided during step 52.

At step 54 the transducers of the transducer array are operated such that the transducer array outputs one or more acoustic waves having the adjusted initial amplitudes and phases that were calculated in step 52. In the embodiment shown in FIG. 3, the transducer array is an ultrasound transducer array, and outputs acoustic waves that are modulated at a frequency between 200 Hz and 300 Hz.

Figure 4:
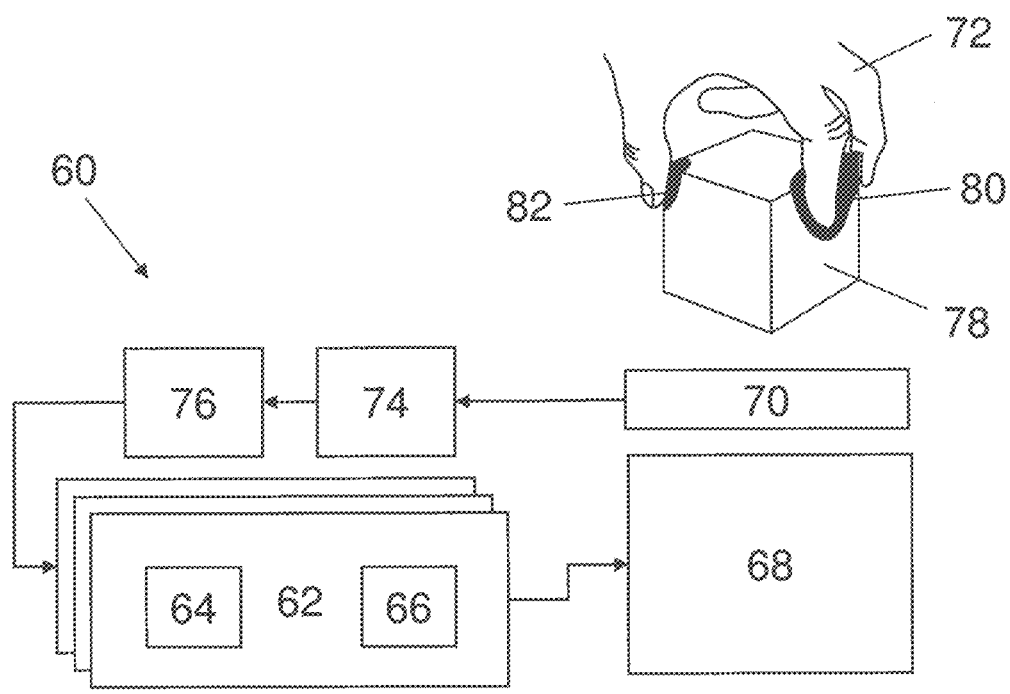
FIG. 4 is a schematic representation showing an apparatus according to a further embodiment of the invention.

FIG. 4 illustrates an apparatus 60 arranged to perform the method described with reference to FIG. 3. Parts of the apparatus which are equivalent to parts of the apparatus shown in FIG. 2 are numbered with like reference numerals.

The apparatus 60 comprises an array of transducers 68, driver boards 62 which comprise data processors 64 and amplifiers 66, a PC 75 and an Ethernet controller 76.

The apparatus further comprises a hand tracker 70. The hand tracker 70 may be, for example a Leap Motion (RTM) Controller. The hand tracker 70 is configured to detect the position of a user's hand 72 in the acoustic field.

In the embodiment shown in FIG. 4, the PC 74 is configured to receive data measured by the hand tracker, process the hand tracker data, and to send the processed data to the driver boards 62 via an Ethernet controller 76.

A three-dimensional virtual shape 78 is defined in a space in which the acoustic field may be produced. The hand tracker 70 is configured to detect when the hand 72 interacts with the virtual shape 78. The transducer array 68 is then operated to produce an acoustic field having relatively high amplitude at points of intersection 80, 82 between the hand 72 and the virtual shape 78 according to the method of the embodiment shown in FIG. 3.

In the embodiment shown in FIG. 4, the transducer array 68 is an ultrasound transducer array and the individual transducers are configured to output ultrasound waves that are modulated at a frequency between 200 Hz and 300 Hz.

The use of an object tracker, such as a hand tracker, provides an advantage of enabling positions of control points to be updated in real time in response to the position of, say, a user's hand which may be moving.

Embodiments of the invention may result in a faster and more predictable control point solution time in comparison with known methods, which in turn means that a higher number of control points can be supported, and may enable real-time updating of the control points. A faster and more predictable solution time also means that an acoustic field of larger volume can be controlled in comparison to known methods As will be apparent from the example described with reference to FIG. 3, embodiments of the invention may be used to provide haptic feedback. In embodiments of the invention, the term "haptic feedback" is used to mean providing tactile sensations as feedback. Haptic feedback has many applications. One example of a possible application of haptic feedback is to provide feedback within systems that may be controlled with gestures, such as computers, mobile devices or interfaces for operating controls in a car. Another application of haptic feedback is in gaming or virtual reality simulations, such as medical simulations that could be used for training for surgery. Another application of haptic feedback is in three dimensional CAD in which a user may be able to undertake three dimensional modelling in mid-air with the help of haptic feedback. Haptic feedback may also be used to provide cues to visually impaired people, for example creating Braille that is projected onto a user's hand. Another application of haptic feedback is to provide feedback for touchless buttons, indicating when such buttons have been pressed. Touchless buttons may have applications in, for example public, interfaces such as ATMs for security and hygiene reasons. A further possible application for haptic feedback is in research in which it would be possible to use haptic feedback to represent microscopic objects and surfaces, to enable users to feel objects that are being researched at a microscopic scale.

Embodiments of the invention may be used for levitation of objects. For example it is sometimes advantageous to be able to experiment on samples of drugs without touching them, to avoid contamination. If the transducers are operated continuously without change, the resultant acoustic wave will have a generally constant configuration. Thus, a small object may be held within a pocket defined by a low amplitude control point that is surrounded horizontally and located vertically above high amplitude control points. A plurality of such pockets may be defined. The control points may be dynamically reassigned to independently move the small objects in three-dimensional space. Another application of using an acoustic field for levitation is in data visualisation in which a large number of small objects could be levitated in three dimensional space to represent a large data set, which would enable the data to be viewed from all angles. An advantage of the invention over known systems for levitation of small objects is that a reflector surface is not required. In some embodiments the thickness of the object may be less than one wavelength of a sound wave of the acoustic field and the width of the object may be greater than one wavelength.

Embodiments of the invention may be used in manufacturing. For example, the algorithm could be used to create targeted air flow which could be targeted at specific areas on a production line to dry surfaces quickly, speeding up manufacturing time.

Embodiments of the invention may be applied to non-destructive testing.

Although the invention has been described above with reference to one or more preferred embodiments, it will be appreciated that various changes or modifications may be made without departing from the scope of the invention as defined in the appended claims. The word "comprising" can mean "including" or "consisting of" and therefore does not exclude the presence of elements or steps other than those listed in any claim or the specification as a whole. The mere fact that certain measures are recited in mutually different dependent claims does not indicate that a combination of these measures cannot be used to advantage.

The invention claimed is:

1. A method comprising: a) producing an acoustic field using an array of real transducers having known relative positions and orientations; b) tracking an object within the acoustic field; c) using at least one point of focused ultrasound, defining a virtual shape that occupies a virtual volume within the acoustic field, wherein the at least one point of focused ultrasound is modeled as being produced by a virtual transducer; and d) positioning the at least one point of focused ultrasound in a region where the object intersects the virtual shape.

2. The method as in claim 1, wherein the virtual transducer is below the at least one point of focused ultrasound.

3. The method as in claim 1, wherein the virtual transducer is in a plane with the array of real transducers.

4. The method as in claim 1, wherein the virtual transducer enables a lookup table to be pre-computed.

5. The method as in claim 1, wherein the virtual transducer matches at least one of the array of real transducers.

6. The method as in claim 1, wherein tracking an object occurs in real time, and further comprising repositioning the at least one point of focused ultrasound in response to a movement in position of the object.

7. The method of claim 6, wherein the object is a human hand.

8. The method of claim 1, wherein an acoustic field comprises ultrasonic frequencies.

9. The method of claim 1, further comprising a modulator to modulate acoustic waves within the acoustic field at a frequency between 0.1 Hz to 500 Hz.

10. The method of claim 1, wherein the array of transducers is substantially air coupled.

11. The method of claim 1, wherein the array of transducers is substantially water coupled.

12. The method of claim 1, wherein the array of transducers amplitudes are scaled such that a highest amplitude transducer operates at substantially full power.

13. A system comprising: an acoustic field in air produced using a plurality of ultrasonic transducers having known relative positions and orientations to each other, wherein at least one of the plurality of ultrasonic transducers is a virtual transducer; a tracker of an object within the acoustic field; a virtual shape defined using at least one point of focused ultrasound produced from at least two of the plurality of ultrasonic transducers that occupies a virtual volume within the acoustic field, wherein the virtual shape is 3-dimensional; and one of the at least one point of focused ultrasound positioned in a region where the object intersects the virtual shape.

14. The method as in claim 13, wherein the virtual transducer is below the virtual shape.

15. The method as in claim 13, wherein the virtual transducer is in a plane with the plurality of ultrasonic transducer.

16. The method as in claim 13, wherein the virtual transducer enables a lookup table to be pre-computed.

17. The system of claim 13, wherein one of the at least one point of focused ultrasound is positioned on an edge of the virtual shape.

18. The system of claim 13, wherein one of the at least one point of focused ultrasound is positioned within the virtual shape.

19. The system of claim 13, further comprising one of the at least one point of focused ultrasound repositioned in response to a movement of the object.

20. The system of claim 16, wherein the object is a human hand.

21. The system of claim 13, further comprising acoustic waves within the acoustic field modulated at a frequency between 0.1 Hz to 500 Hz.

22. The system of claim 13, further comprising acoustic waves within the acoustic field modulated at a frequency between 0 Hz and half of a carrier frequency of the acoustic waves.

23. A system comprising: an acoustic field in air produced using a plurality of ultrasonic transducers having known relative positions and orientations to each other, wherein at least one of the plurality of ultrasonic transducers is a virtual transducer; a tracker of an object within the acoustic field; a virtual shape defined using at least two points of focused ultrasound produced from at least two of the plurality of ultrasonic transducers that occupies a virtual volume within the acoustic field; wherein two of the at least two points of focused ultrasound are positioned in a region where the object intersects the virtual shape.

24. The method as in claim 23, wherein the virtual transducer is below the virtual shape.

25. The method as in claim 23, wherein the virtual transducer is in a plane with the plurality of ultrasonic transducer.

26. The method as in claim 23, wherein the virtual transducer enables a lookup table to be pre-computed.

27. The system of claim 23, wherein two of the at least two points of focused ultrasound are positioned on an edge of the virtual shape.

28. The system of claim 23, wherein two of the at least two points of focused ultrasound are positioned within the virtual shape.

29. The system of claim 23, further comprising two of the at least two points of focused ultrasound repositioned in response to movement of the object.

30. The system of claim 23, wherein the object is a human hand.

31. The system of claim 23, further comprising acoustic waves within the acoustic field modulated at a frequency between 0.1 Hz to 500 Hz.

32. The system of claim 23, further comprising acoustic waves within the acoustic field modulated at a frequency between 0 Hz and half of a carrier frequency of the acoustic waves.

33. The system of claim 23, wherein the virtual shape is 3-dimensional.

* * * * *